United States Patent
Kim et al.

(10) Patent No.: US 12,075,483 B2
(45) Date of Patent: *Aug. 27, 2024

(54) METHOD AND DEVICE FOR TRANSMITTING AND RECEIVING WIRELESS SIGNALS IN WIRELESS COMMUNICATION SYSTEM

(71) Applicant: LG Electronics Inc., Seoul (KR)

(72) Inventors: Seonwook Kim, Seoul (KR); Changhwan Park, Seoul (KR); Joonkui Ahn, Seoul (KR); Suckchel Yang, Seoul (KR); Sechang Myung, Seoul (KR)

(73) Assignee: LG Electronics Inc., Seoul (KR)

( * ) Notice: Subject to any disclaimer, the term of this patent is extended or adjusted under 35 U.S.C. 154(b) by 373 days.

This patent is subject to a terminal disclaimer.

(21) Appl. No.: 17/607,824

(22) PCT Filed: May 4, 2020

(86) PCT No.: PCT/KR2020/005886
§ 371 (c)(1),
(2) Date: Oct. 29, 2021

(87) PCT Pub. No.: WO2020/222612
PCT Pub. Date: Nov. 5, 2020

(65) Prior Publication Data
US 2022/0210840 A1    Jun. 30, 2022

(30) Foreign Application Priority Data

Apr. 30, 2019 (KR) ................. 10-2019-0050766
Aug. 15, 2019 (KR) ................. 10-2019-0100001
Mar. 25, 2020 (KR) ................. 10-2020-0036296

(51) Int. Cl.
*H04W 74/00* (2009.01)
*H04W 72/0446* (2023.01)
(Continued)

(52) U.S. Cl.
CPC ... *H04W 74/0833* (2013.01); *H04W 72/0446* (2013.01); *H04W 74/006* (2013.01); *H04W 74/0866* (2013.01)

(58) Field of Classification Search
CPC .......... H04W 72/0446; H04W 74/006; H04W 84/0866
(Continued)

(56) References Cited

U.S. PATENT DOCUMENTS 11,219,008 B2    1/2022    Oh et al.
2019/0182829 A1  6/2019    Choi et al.
(Continued)

FOREIGN PATENT DOCUMENTS

KR    10-2018-0094722    8/2018
WO    WO2018/230965     12/2018

OTHER PUBLICATIONS

Extended European Search Report in European Appln. No. 20797998. 0, dated Dec. 9, 2022, 11 pages.
(Continued)

*Primary Examiner* — Dang T Ton
(74) *Attorney, Agent, or Firm* — Fish & Richardson P.C.

(57) ABSTRACT

The present invention relates to a wireless communication system, and specifically to a method and a device therefor, the method comprising: a step for receiving group common DCI including slot format information and channel occupancy duration information; a step for determining slot formats for one or more slots on the basis of the slot format information and the channel occupancy duration informa-
(Continued)

tion; and a step for performing communication on the basis of the determined slot formats for the one or more slots.

15 Claims, 21 Drawing Sheets

(51) Int. Cl.
 *H04W 74/08* (2009.01)
 *H04W 74/0833* (2024.01)
(58) Field of Classification Search
 USPC .......................................... 370/329, 395, 403
 See application file for complete search history.

(56) References Cited

U.S. PATENT DOCUMENTS

| | | | |
|---|---|---|---|
| 2019/0268930 | A1 | 8/2019 | Rudolf et al. |
| 2020/0286971 | A1 | 9/2020 | Kwak et al. |
| 2021/0168842 | A1 | 6/2021 | Liang et al. |
| 2021/0250928 | A1* | 8/2021 | Seo .......................... H04L 5/001 |
| 2021/0306117 | A1 | 9/2021 | Salim |
| 2023/0354220 | A1* | 11/2023 | Rastegardoost ........ H04L 5/001 |

OTHER PUBLICATIONS

Huawei & HiSilicon, "DL channels and signals in NR unlicensed band," R1-1812192, Presented at 3GPP TSG RAN WGI Meeting #95, Spokane, USA, Nov. 12-16, 2018, 7 pages.
LG Electronics, "Wide-band operation for NR-U," R1-1900610, Presented at 3GPP TSG RAN WG1 Ad-Hoc Meeting 1901, Taipei, Taiwan, Jan. 21-25, 2019, 6 pages.
NTT Docomo, Inc., "Wide-band operation for NR-U," R1-1904952, Presented at 3GPP TSG RAN WG1 #96bis, Xi'an, China, Apr. 8-12, 2019, 5 pages.
Vivo, "Discussion on wideband operation in NR-U," R1-1904069, Presented at 3GPP TSG RAN WG1 #96bis, Xi'an, China, Apr. 8-12, 2019, 5 pages.
Office Action in U.S. Appl. No. 18/154,345, mailed on May 25, 2023, 7 pages.
ASUSTeK, "DL signals and channels for NR-U," 3GPP TSG RAN WG1 #96bis, R1-1905087, Xi'an, China, Apr. 8-12, 2019, 4 pages.
Ericsson, "DL signals and channels for NR-U," 3GPP TSG-RAN WG1 Meeting #96bis, R1-1904333, Xi'an, China, Apr. 8-12, 2019, 8 pages.
LG Electronics, "Frame structure for NR unlicensed operation," 3GPP TSG RAN WG1 Meeting #94bis, R1-1810266, Chengdu, China, Oct. 8-12, 2018, 6 pages.
Office Action in European Appln. No. 20797998.0, mailed on Jul. 21, 10 pages.
Xiaomi, "Frame structure for NR-U," 3GPP TSG RAN WG1 Meeting #95, R1-1813360, Spokane, USA, Nov. 12-16, 2018, 5 pages.
Google, "Discussion on DL signals and channels in NR unlicensed", R1-1905086, 3GPP TSG RAN WG1 #96bis, Xi'an, China, Apr. 8-12, 2019, 7 pages.
Intel Corporation, "DL Signals and Channels for NR-unlicensed", R1-1904283, 3GPP TSG RAN WG1 Meeting #96bis, Xi'an, China, April 8-Apr. 12, 2019, 7 pages.
International Search Report and Written Opinion in International Appln. No. PCT/KR2020/005886, dated Aug. 20, 2020, 15 pages (with English translation).
Nokia, Nokia Shanghai Bell, "On DL signals and channels", R1-1904193, 3GPP TSG RAN WG1 Meeting #96bis, Xi'an, China, Apr. 8-12, 2019, 15 pages.
Samsung, "DL signals and channels for NR-U", R1-1904404, 3GPP TSG RAN WG1 #96, Xi'an, China, Apr. 8-12, 2019, 7 pages.

* cited by examiner (a) Carrier aggregation between L-band and U-band (b) Standalone U-band(s)

METHOD AND DEVICE FOR TRANSMITTING AND RECEIVING WIRELESS SIGNALS IN WIRELESS COMMUNICATION SYSTEM

CROSS-REFERENCE TO RELATED APPLICATIONS

This application is a National Stage application under 35 U.S.C. § 371 of International Application No. PCT/KR2020/005886, filed on May 4, 2020 which claims the benefit of Korean Patent Application No. 10-2019-0050766, filed on Apr. 30, 2019, Korean Patent Application No. 10-2019-0100001, filed on Aug. 15, 2019, and Korean Patent Application No. 10-2020-0036296, filed on Mar. 25, 2020. The disclosures of the prior applications are incorporated by reference in their entirety.

TECHNICAL FIELD

The present disclosure relates to a wireless communication system, and more particularly, to a method and apparatus for transmitting and receiving a wireless signal.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

Provided are a method and apparatus for efficiently performing a wireless signal transmission and reception process.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In a first aspect of the present disclosure, a method for performing communication by a terminal in a wireless communication system may include: receiving group common Downlink Control Information (DCI) including slot format information and channel occupancy duration information; determining a slot format for one or more slots based on the slot format information and the channel occupancy duration information; and performing communication based on the determined slot format for the one or more slots. The slot format information may correspond to N slot formats, each of the slot formats corresponding to a symbol configuration of a corresponding slot within N consecutive slots, where N may be an integer greater than or equal to 1. The channel occupancy duration information may correspond to a channel occupancy duration, the channel occupancy duration including M consecutive slots, where M may be an integer greater than or equal to 1.

In a second aspect of the present disclosure, a terminal used in a wireless communication system may include: at least one processor; and at least one computer memory operably coupled to the at least one processor and configured to cause, when executed, the at least one processor to perform an operation. The operation may include: receiving group common Downlink Control Information (DCI) including slot format information and channel occupancy duration information; determining a slot format for one or more slots based on the slot format information and the channel occupancy duration information; and performing communication based on the determined slot format for the one or more slots. The slot format information may correspond to N slot formats, each of the slot formats corresponding to a symbol configuration of a corresponding slot within N consecutive slots, where N may be an integer greater than or equal to 1. The channel occupancy duration information may correspond to a channel occupancy duration, the channel occupancy duration including M consecutive slots, where M may be an integer greater than or equal to 1.

In a third aspect of the present disclosure, an apparatus for a terminal may include: at least one processor; and at least one computer memory operably coupled to the at least one processor and configured to cause, when executed, the at least one processor to perform an operation. The operation may include: receiving group common Downlink Control Information (DCI) including slot format information and channel occupancy duration information; determining a slot format for one or more slots based on the slot format information and the channel occupancy duration information; and performing communication based on the determined slot format for the one or more slots. The slot format information may correspond to N slot formats, each of the slot formats corresponding to a symbol configuration of a corresponding slot within N consecutive slots, where N may be an integer greater than or equal to 1. The channel occupancy duration information may correspond to a channel occupancy duration, the channel occupancy duration including M consecutive slots, where M may be an integer greater than or equal to 1.

In a fourth aspect of the present disclosure, provided herein is a computer-readable storage medium including at least one computer program configured to cause, when executed, the at least one processor to perform an operation. The operation may include: receiving group common Downlink Control Information (DCI) including slot format information and channel occupancy duration information; determining a slot format for one or more slots based on the slot format information and the channel occupancy duration information; and performing communication based on the determined slot format for the one or more slots. The slot format information may correspond to N slot formats, each of the slot formats corresponding to a symbol configuration of a corresponding slot within N consecutive slots, where N may be an integer greater than or equal to 1. The channel occupancy duration information may correspond to a channel occupancy duration, the channel occupancy duration including M consecutive slots, where M may be an integer greater than or equal to 1.

Based on N being less than M, the communication may be performed on an assumption that the N slot formats sequentially correspond to slots subsequent to an N-th slot in the channel occupancy duration.

Based on N being less than M, the communication may be performed on an assumption that the last slot format of the N slot formats repeatedly may correspond to the slots subsequent to the N-th slot in the channel occupancy duration.

Based on N being greater than M, the communication may be performed only in the channel occupancy duration based on the slot format information, while slot formats after an M-th slot format among the N slot formats are ignored.

Based on N being greater than M, the communication may be performed on an assumption that only UL symbols are valid in the slot formats after the M-th slot format among the N slot formats.

Advantageous Effects

According to the present disclosure, a wireless signal may be efficiently transmitted and received in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, illustrate embodiments of the present disclosure and together with the description serve to explain the principle of the present disclosure.

MODE FOR DISCLOSURE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

As more and more communication devices require larger communication capacities, the need for enhanced mobile broadband communication relative to the legacy radio access technologies (RATs) has emerged. Massive machine type communication (MTC) providing various services to inter-connected multiple devices and things at any time in any place is one of significant issues to be addressed for next-generation communication. A communication system design in which services sensitive to reliability and latency are considered is under discussion as well. As such, the introduction of the next-generation radio access technology (RAT) for enhanced mobile broadband communication (eMBB), massive MTC (mMTC), and ultra-reliable and low latency communication (URLLC) is being discussed. For convenience, this technology is called NR or New RAT in the present disclosure.

While the following description is given in the context of a 3GPP communication system (e.g., NR) for clarity, the technical spirit of the present disclosure is not limited to the 3GPP communication system.

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

Figure 1:
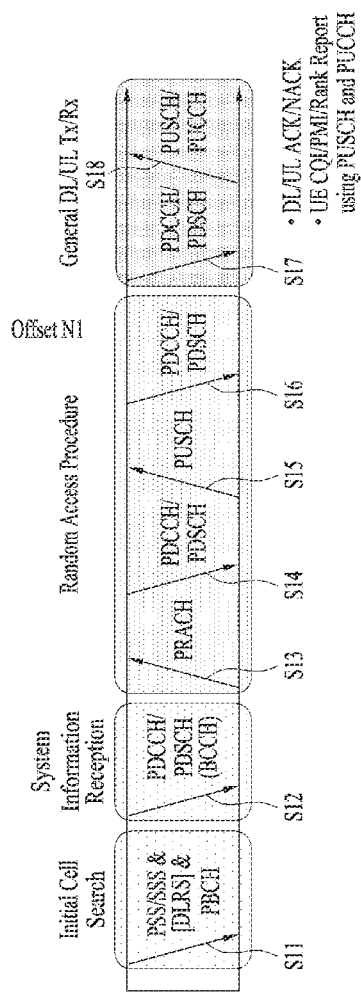
FIG. 1 illustrates physical channels and a general signal transmission method using the physical channels in a 3rd generation partnership project (3GPP) system as an exemplary wireless communication system.

FIG. 1 illustrates physical channels and a general signal transmission method using the physical channels in a 3GPP system.

When a UE is powered on or enters a new cell, the UE performs initial cell search (S101). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

Subsequently, to complete connection to the BS, the UE may perform a random access procedure with the BS (S103 to S106). Specifically, the UE may transmit a preamble on a physical random access channel (PRACH) (S103) and may receive a PDCCH and a random access response (RAR) for the preamble on a PDSCH corresponding to the PDCCH (S104). The UE may then transmit a physical uplink shared channel (PUSCH) by using scheduling information in the RAR (S105), and perform a contention resolution procedure including reception of a PDCCH and a PDSCH signal corresponding to the PDCCH (S106).

After the above procedure, the UE may receive a PDCCH and/or a PDSCH from the BS (S107) and transmit a physical uplink shared channel (PUSCH) and/or a physical uplink control channel (PUCCH) to the BS (S108), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
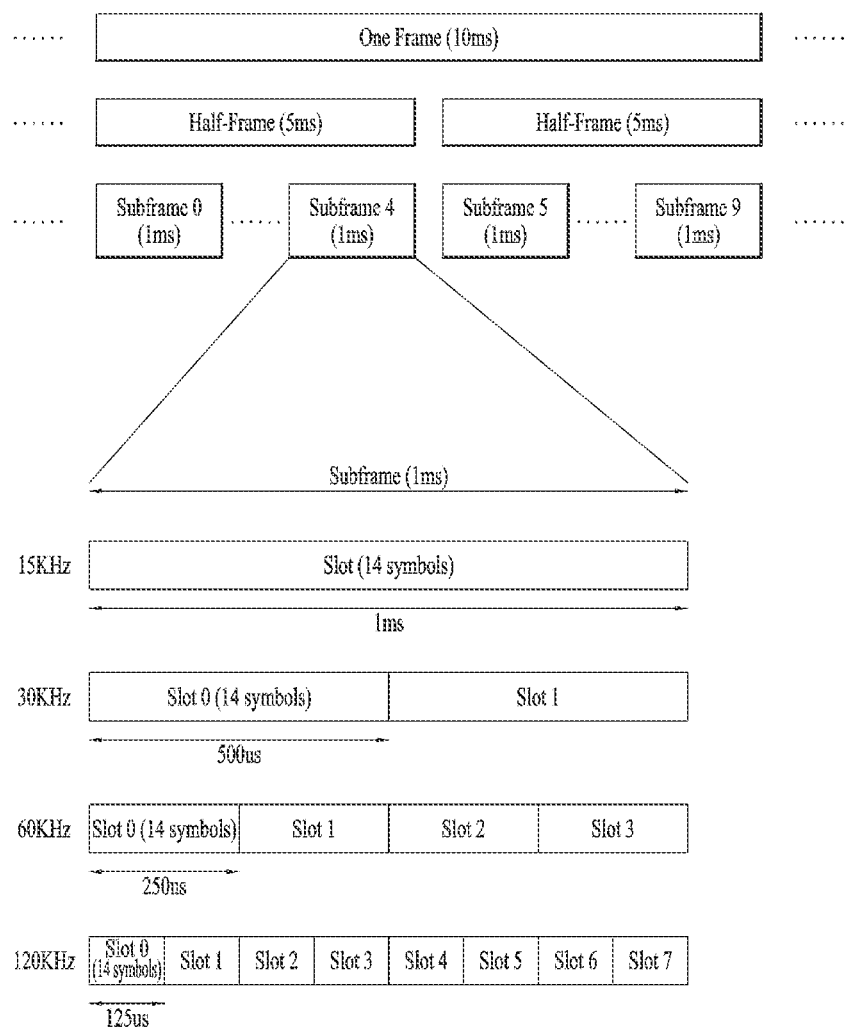
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame, u}_{slot}$: number of slots in a frame
* $N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The frame structure is merely an example, and the number of subframes, the number of slots, and the number of symbols in a frame may be changed in various manners.

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells. A symbol may include an OFDM symbol (or a CP-OFDM symbol) and an SC-FDMA symbol (or a discrete Fourier transform-spread-OFDM (DFT-s-OFDM) symbol).

NR may support various numerologies (or subcarrier spacings (SCSs)) to provide various 5G services. For example, NR may support a wide area in conventional cellular bands in an SCS of 15 kHz and support a dense urban area and a wide carrier bandwidth with lower latency in an SCS of 30/60 kHz. In an SCS of 60 kHz or above, NR may support a bandwidth higher than 24.25 GHz to overcome phase noise.

NR frequency bands may be divided into two frequency ranges: frequency range 1 (FR1) and frequency range 2 (FR2). FR1 and FR2 may be configured as shown in Table 3 below. FR 2 may mean a millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
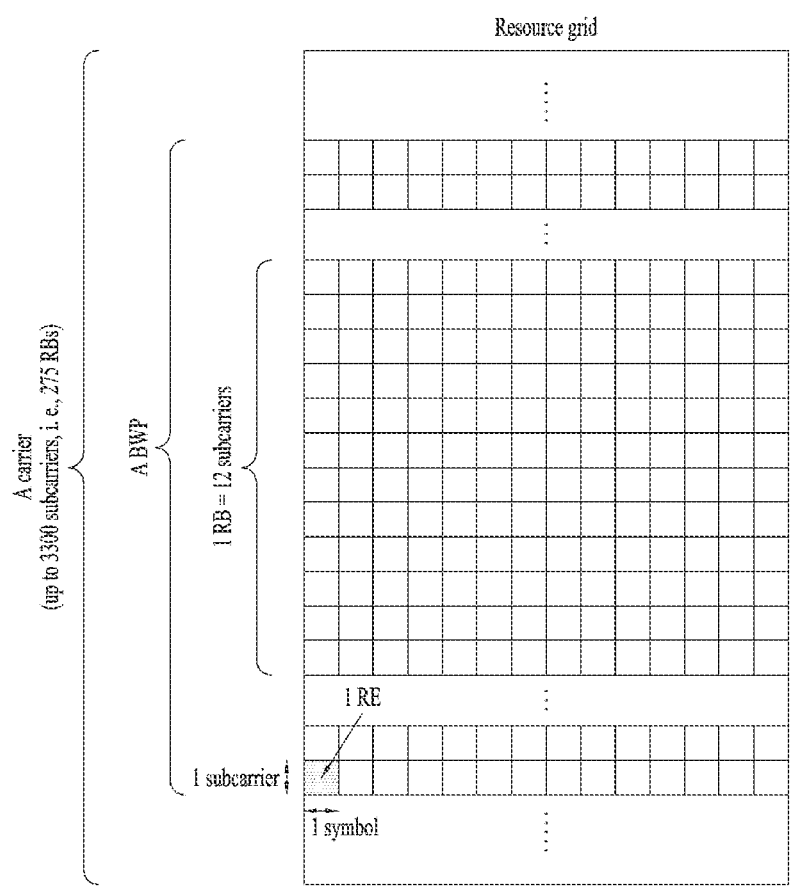
FIG. 3 illustrates a resource grid of a slot.

FIG. 3 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
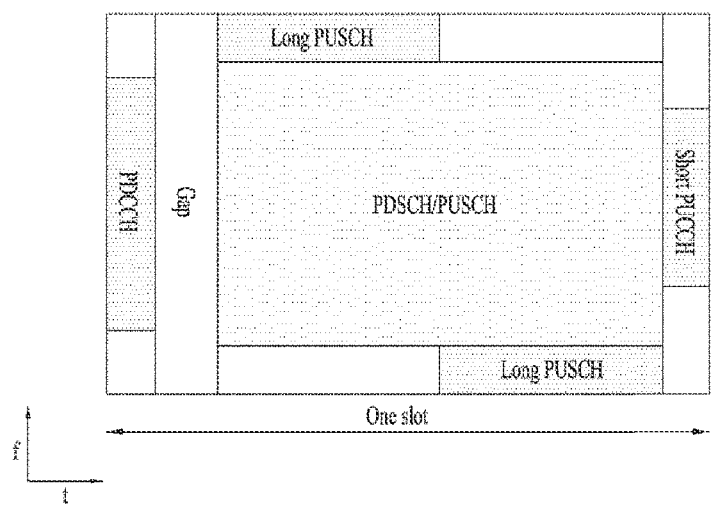
FIG. 4 illustrates mapping of physical channels in a slot.

FIG. 4 illustrates a structure of a slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel (e.g., PDCCH), and the last M symbols (hereinafter, UL control region) in the slot may be used to transmit a UL control channel (e.g., PUCCH). N and M are integers greater than or equal to 0. A resource region (hereinafter, a data region) that is between the DL control region and the UL control region may be used for DL data (e.g., PDSCH) transmission or UL data (e.g., PUSCH) transmission. The GP provides a time gap for the BS and UE to transition from the transmission mode to the reception mode or from the reception mode to the transmission mode. Some symbols at the time of DL-to-UL switching in a subframe may be configured as the GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling (CS), and so on.

Various DCI formats are provided according to information in the DCI.

Table 4 exemplarily shows DCI formats transmitted on the PDCCH.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Table 5 exemplarily shows usages and transport channels of the PDCCH according to RNTIs. The transport channels are related to data carried by a PDSCH/PUSCH scheduled by the PDCCH.

TABLE 5

| RNTI | Usage | Transport Channel |
| --- | --- | --- |
| P-RNTI | Paging and System Information change notification | PCH(Paging Channel) |
| SI-RNTI | Broadcast of System Information | DL-SCH |
| RA-RNTI | Random Access Response | DL-SCH |
| C-RNTI | Dynamically scheduled unicast transmission | UL SCH, DL-SCH |
| SFI(Slot Format Indication)-RNTI | Slot Format Indication on the given cell | N/A |

The modulation scheme for the PDCCH is fixed (e.g., Quadrature Phase Shift Keying (QPSK)), and one PDCCH is composed of 1, 2, 4, 8, or 16 control channel elements (CCEs) according to an aggregation level (AL). One CCE is composed of six resource element groups (REGs). One REG is defined as one OFDMA symbol and one (P)RB. The PDCCH is transmitted through a control resource set (CORESET). The CORESET corresponds to a set of physical resources/parameters used to carry PDCCH/DCI within a BWP. For PDCCH reception, the UE may monitor (e.g., blind-decode) a set of PDCCH candidates in the CORESET. The PDCCH candidates represent CCE(s) monitored by the UE for PDCCH reception/detection. PDCCH monitoring may be performed in one or more CORESETs in an active DL BWP in each activated cell in which PDCCH monitoring is configured. A set of PDCCH candidates monitored by the UE is defined as a PDCCH search space (SS) set. The SS set may be a common search space (CSS) set or a UE-specific search space (USS) set.

Table 6 exemplarily shows PDCCH SSs.

TABLE 6

| Search Space | Type | RNTI | Use Case |
| --- | --- | --- | --- |
| Type0-PDCCH | Common | SI-RNTI on a primary cell | Broadcast of System Information |
| Type0A-PDCCH | Common | SI-RNTI on a primary cell | Broadcast of System Information |
| Type1-PDCCH | Common | RA-RNTI or TC-RNTI on a primary cell | Msg2, Msg4 in RACH |
| Type2-PDCCH | Common | P-RNTI on a primary cell | Paging system Information change notification |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI or CS-RNTI | Group signaling |
| UE Specific | UE Specific | C-RNTI, MCS-C-RNTI or CS-RNTI | UE signaling (e.g., PDSCH/PUSCH) |

The PUCCH delivers uplink control information (UCI). The UCI includes the following information.

SR: information used to request UL-SCH resources.

HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term "HARQ-ACK is interchangeably used with HARQ ACK/NACK and ACK/NACK.

CSI: feedback information for a DL channel. Multiple input multiple output (MIMO)-related feedback information includes an RI and a PMI.

Table 7 illustrates exemplary PUCCH formats. PUCCH formats may be divided into short PUCCHs (Formats 0 and 2) and long PUCCHs (Formats 1, 3, and 4) based on PUCCH transmission durations.

TABLE 7

| PUCCH format | Length in OFDM symbols $N_{symb}^{PUCCH}$ | Number of bits | Usage | Etc |
| --- | --- | --- | --- | --- |
| 0 | 1-2 | ≤2 | HARQ, SR | Sequence selection |

TABLE 7-continued

| PUCCH format | Length in OFDM symbols $N_{symb}^{PUCCH}$ | Number of bits | Usage | Etc |
|---|---|---|---|---|
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

Figure 5:
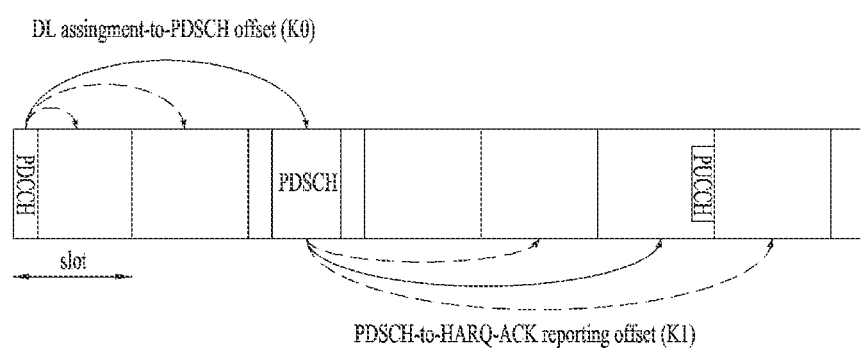
FIG. 5 illustrates an acknowledgment/negative acknowledgment (ACK/NACK) transmission process.

FIG. 5 illustrates an ACK/NACK transmission process. Referring to FIG. 5, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 and DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot PDSCH-to-HARQ feedback timing indicator: Indicates K1.

HARQ process number (4 bits): Indicates the HARQ process ID of data (e.g., a PDSCH or TB).

PUCCH resource indicator (PRI): Indicates PUCCH resource used for UCI transmission among a plurality of PUCCH resources in a PUCCH resource set.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Figure 6:
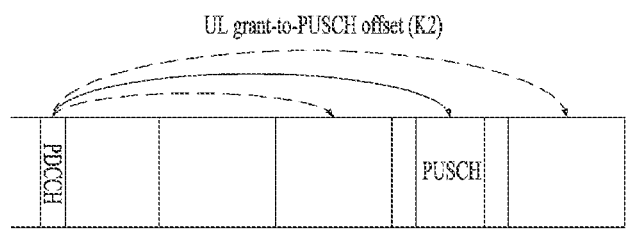
FIG. 6 illustrates a physical uplink shared channel (PUSCH) transmission process.

FIG. 6 illustrates an exemplary PUSCH transmission process. Referring to FIG. 6, the UE may detect a PDCCH in slot #n. The PDCCH may include UL scheduling information (e.g., DCI format 0_0 or DCI format 0_1). DCI format 0_0 and DCI format 0_1 may include the following information.

Frequency domain resource assignment: Indicates an RB set allocated to a PUSCH.

Time domain resource assignment: Specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB. When PUCCH transmission time and PUSCH transmission time overlaps, UCI can be transmitted via PUSCH (PUSCH piggyback).

Figure 7:
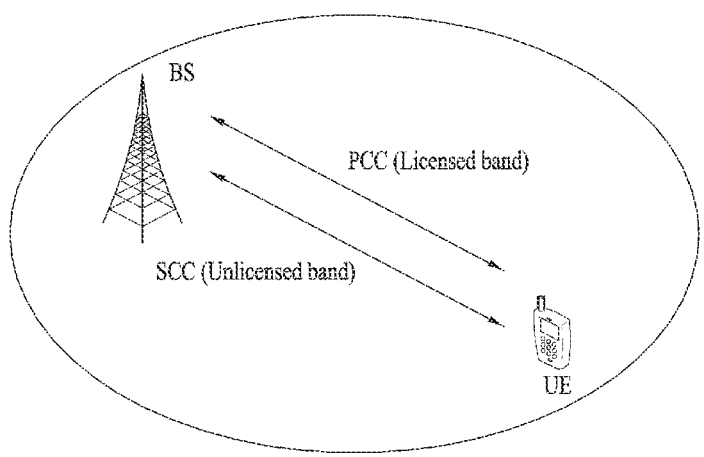
FIG. 7 illustrates an exemplary wireless communication system supporting an unlicensed band.
Figure 7:
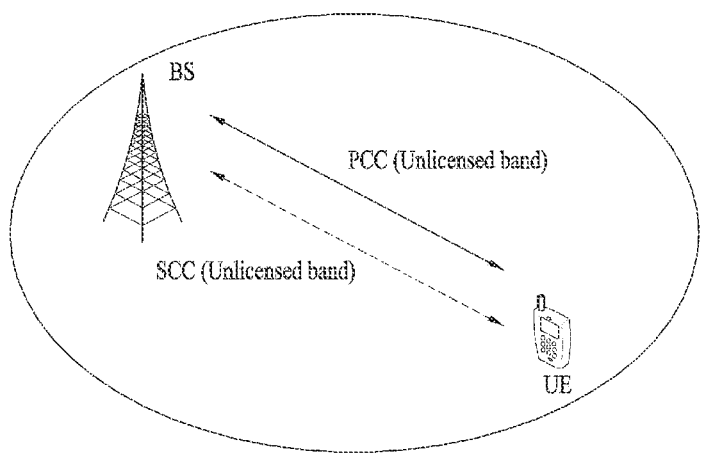

FIG. 7 illustrates an exemplary wireless communication system supporting an unlicensed band applicable to the present disclosure. In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When carrier aggregation is supported, one UE may use a plurality of aggregated cells/carriers to exchange a signal with the BS. When one UE is configured with a plurality of CCs, one CC may be set to a primary CC (PCC), and the remaining CCs may be set to secondary CCs (SCCs). Specific control information/channels (e.g., CSS PDCCH, PUCCH) may be transmitted and received only on the PCC. Data may be transmitted and received on the PCC/SCC. FIG. 7(a) shows a case in which the UE and BS exchange signals on both the LCC and UCC (non-standalone (NSA) mode). In this case, the LCC and UCC may be set to the PCC and SCC, respectively. When the UE is configured with a plurality of LCCs, one specific LCC may be set to the PCC, and the remaining LCCs may be set to the SCC. FIG. 7(a) corresponds to the LAA of the 3GPP LTE system. FIG. 7(b) shows a case in which the UE and BS exchange signals on one or more UCCs with no LCC (standalone (SA) mode). In this case, one of the UCCs may be set to the PCC, and the remaining UCCs may be set to the SCC. Both the NSA mode and SA mode may be supported in the U-band of the 3GPP NR system.

The signal transmission/reception operation in an unlicensed band described in the present disclosure may be performed based on the above-described deployment scenario (unless otherwise stated). Also, the definitions below may be applied to terms used herein.

Channel: May be composed of consecutive RBs in which a channel access procedure is performed in a shared spectrum, and may refer to a carrier or a part of a carrier.

Channel Access Procedure (CAP): Represents a procedure for evaluating channel availability based on sensing in order to determine, before signal transmission, whether other communication node(s) use a channel. A basic unit for sensing is a sensing slot of duration $T_{sl}$=9 us. If a BS or a UE senses a channel for the sensing slot duration, and the power detected for at least 4 us within the sensing slot duration is less than a energy detection threshold $X_{Thresh}$, the sensing slot duration $T_{sl}$ is considered an idle state. Otherwise, the sensing slot duration $T_{sl}$=9 us is considered a busy state. The CAP may be referred to as Listen-Before-Talk (LBT).

Channel occupancy: Means the corresponding transmission(s) by the BS/UE on the channel(s) after the CAP is performed.

Channel Occupancy Time (COT): Refers to the total time for which the BS/UE and any BS/UE(s) sharing the channel occupancy may perform transmission(s) on the channel after the BS/UE performs the CAP. In determining the COT, when the transmission gap is 25 us or less, the gap period is also counted in the COT. The COT may be shared for transmission between the BS and the corresponding UE(s).

DL transmission burst: Defined as a set of transmissions from the BS, with no gap exceeding 16 us. Transmissions from the BS, separated by a gap exceeding 16 us, are considered DL transmission bursts separate from each other. In the DL transmission burst, the BS may perform the transmission(s) after the gap without sensing channel availability.

UL transmission burst: Defined as a set of transmissions from the UE, with no gap exceeding 16 us. Transmissions from the UE, separated by a gap exceeding 16 us, are considered UL transmission bursts separate from each other. In the UL transmission burst, the UE may perform transmission(s) after the gap without sensing channel availability.

Figure 8:
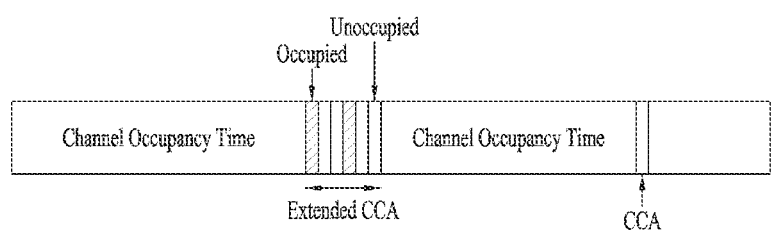
FIG. 8 illustrates an exemplary method of occupying resources in an unlicensed band.

FIG. 8 illustrates an exemplary method of occupying resources in an unlicensed band. A communication node (e.g., a BS, a UE) within the unlicensed band must determine whether the channel is used by other communication node(s) before signal transmission. To this end, the communication node in the unlicensed band may perform the CAP to access the channel(s) on which the transmission(s) is performed. The CAP may be performed based on sensing. For example, the communication node may first perform carrier sensing (CS) before signal transmission to check whether other communication node(s) are transmitting a signal. A case where it is determined that the other communication node(s) does not transmit a signal is defined as confirming clear channel assessment (CCA). When there is a CCA threshold (e.g., $X_{Thresh}$) that is pre-defined or set by a higher layer (e.g., RRC), the communication node determines the channel state as busy if energy higher than the CCA threshold is detected on the channel. Otherwise, the channel state may be determined as idle. When it is determined that the channel state is idle, the communication node may start transmitting a signal in the unlicensed band.

Table 8 exemplarily shows the types of CAP.

TABLE 8

| | Type | Explanation |
|---|---|---|
| DL/UL | Type 1 C P | CAP with random back-off - time duration spanned by the sensing slots that are sensed to be idle before a downlink transmission(s) is random |
| | Type 2 CAP | CAP without random back-off - time duration spanned by the sensing slots that are sensed to be idle before a downlink transmission(s) is deterministic |

Figure 9:
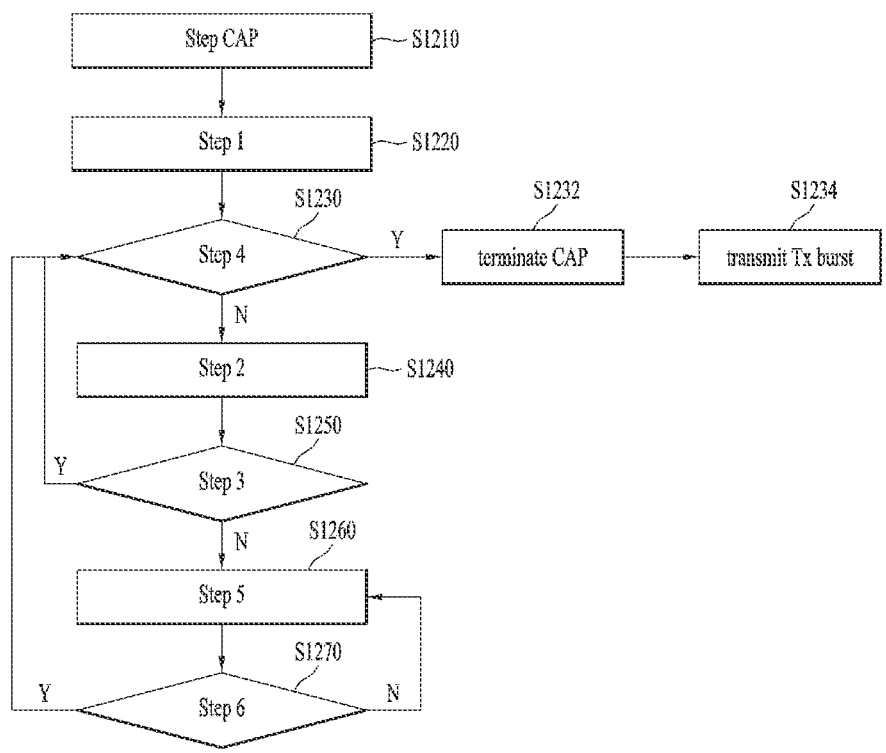
FIG. 9 illustrates a channel access procedure (CAP).

FIG. 9 is a flowchart of a CAP operation for transmitting a downlink signal through an unlicensed band of a BS. Referring to FIG. 9, the BS first senses whether a channel is in an idle state for a sensing slot duration of a defer duration $T_d$, and may then perform transmission when the counter N reaches 0 (S1234). Here, the counter N is adjusted by sensing the channel for additional sensing slot duration(s) according to the procedure below:

Step 1) (S1220) Set N=$N_{init}$. Here, $N_{init}$ is a random value uniformly distributed between 0 and $CW_p$. Then, go to step 4.

Step 2) (S1240) If N>0 and the BS chooses to decrement the counter, set N=N−1.

Step 3) (S1250) Sense a channel for an additional sensing slot duration. Then, if the additional sensing slot duration is idle (Y), go to step 4. If not (N), go to step 5.

Step 4) (S1230) If N=0 (Y), terminate the CAP (S1232). Otherwise (N), go to step 2.

Step 5) (S1260) Sense a channel until a busy sensing slot is detected within the additional defer duration $T_d$ or all sensing slots within the additional delay period Ta are detected as idle.

Step 6) (S1270) If the channel is sensed as idle for all sensing slot durations of the additional defer duration $T_d$ (Y), go to step 4. If not (N), go to step 5.

Table 9 exemplarily shows that $m_p$, the minimum contention window (CW), the maximum CW, the maximum channel occupancy time (MCOT) and the allowed CW size applied to the CAP vary according to the channel access priority class.

TABLE 9

| Channel Access Priority Class (p) | $m_p$ | $CW_{min,p}$ | $CW_{max,p}$ | $T_{mcot,p}$ | allowed $CW_p$ size |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The defer duration $T_d$ is composed of a duration of $m_p$ consecutive sensing slot $T_{sl}$ (9 us)+duration $T_f$ (16 us). $T_f$ includes the sensing slot duration $T_{sl}$ at the start of the 16 us duration.

Embodiment: Signal Transmission in NR-U

For a UE, only a single carrier may be configured, or a plurality of carriers may be aggregated/configured in an unlicensed band. In this case, a maximum of four BWPs may be configured for each carrier, and only one BWP may be activated. When a frequency band unit forming a basis of CAP in the unlicensed band is defined as a CAP-BW, each carrier/BWP may correspond to one CAP-BW or may a plurality of CAP-BWs. The size of one CAP-BW may be a fixed value or may be set differently according to the configuration of the network (or BS). For example, the size of one CAP-BW may be fixed to 20 MHz or may be variably set within a carrier based on higher layer (e.g., RRC) signaling and/or DCI. When the CAP-BW configuration information is not configured, the CAP-BW size/deployment may follow a predefined value according to the frequency region of the carrier. The CAP-BW may be composed of consecutive RBs (hereinafter, an RB set). In the present disclosure, the CAP-BW and the RB set may have the same meaning.

Figure 10:
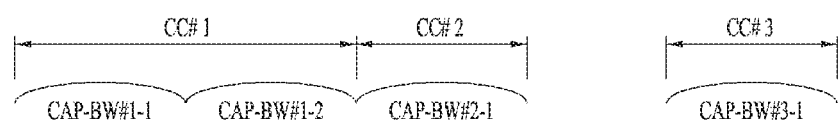
FIG. 10 illustrates a CAP-bandwidth (CAP-BW).

FIG. 10 illustrates a case where CAP-BWs are configured in carriers. Referring to FIG. 10, three component carriers (CCs) are configured. CC #1 may correspond to two CAP-BWs, and each of CCs #2 and #3 may correspond to one CAP-BW. CC #1/#2 may be defined as intra-band carrier aggregation (CA), and CC #1/#2 and CC #3 may be defined as inter-band CA.

In this case, the BS may perform CAP for each CAP-BW and may transmit a DL burst in a (CAP successful) CAP-BW and skip transmitting a DL burst in other (CAP failed) CAP-BWs according to the results of the CAP. In addition, in a CAP-BW occupied for a predetermined time through the CAP, a portion of the occupancy time may be shared with the UL burst. Also, informing the UE of the frequency domain occupancy information about the BS may be advantageous in at least the following aspects.

The UE may perform power saving by skipping PDCCH monitoring in a CAP-BW (e.g., CAP-BW OFF state) known not to be occupied by the BS. Here, skipping PDCCH monitoring may include skipping monitoring of a DCI format (e.g., DCI format 0_X, DCI format 1_X) for data scheduling. However, PDCCH monitoring for receiving a group common DCI format (e.g., DCI format 2_0) in the CAP-BW OFF duration may be exceptionally performed.

The UE may save power by skipping CSI/RRM (Radio Resource Management)/RLM (Radio Link Monitoring) measurement in a CAP-BW that is known not to be occupied by the BS. For example, when the CSI-RS is configured to be transmitted in a CAP-BW OFF slot, the UE may skip channel measurement based on the CSI-RS in the CAP-BW OFF slot. Alternatively, the CSI-RS in the CAP-BW OFF slot may be excluded from the channel measurement procedure.

For a CAP for UL burst transmission shared with a DL burst occupied by the BS, UL transmission may be allowed if the channel is idle only for a certain time without random backoff, or may be allowed even without checking whether the channel is idle/busy.

In the existing NR system, the DL/UL direction may be dynamically signaled through DCI. Specifically, SFI fields for a plurality of cells may be included in the DCI, and the SFI field position of a cell in the DCI bitstream may be determined based on an offset set for the cell. For example, suppose an SFI field corresponding to cell #1 is represented in 3 bits and an SFI field corresponding to cell #2 is represented in 5 bits. In this case, in the DCI for SFI indication having the total size of 100 bits, a section corresponding to cell #1 may be 3 bits from N1 (e.g., N1=14) bits, and a section corresponding to cell #2 may be 5 bits from N2 (e.g., N2=50) bits. N1 and N2 are set for each cell. The SFI field includes an SFI-index. SFI-index corresponds to one SlotFormatCombination, and SlotFormatCombination indicates the slot format for K (=>1) consecutive slots. The slot format indicates DL/UL/flexible for each symbol in the slot. K may also be set differently for each SFI-index. In the existing NR, the DCI for SFI indication may correspond to DCI format 2_0 as a group common PDCCH, and may be scrambled with SFI-RNTI. The UE may perform communication in the slot based on the slot format. For example, in the slot, PDCCH monitoring/reception, PDSCH reception, and/or CSI-RS reception/measurement may be performed in a DL symbol, and PUCCH transmission, PUSCH transmission, and/or SRS transmission may be performed in a UL symbol.

Table 10 exemplarily shows slot formats. Here, D denotes a DL symbol, U denotes a UL symbol, and F denotes a flexible symbol.

| Format | Symbol number in a slot | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| ... | ... | ... | ... | ... | ... | ... | ... | ... | ... | ... | ... | ... | ... | ... |
| 255 | D | D | F | F | F | U | U | U | D | D | D | D | D | D |

Hereinafter, in the present disclosure, a method of notifying DL/UL direction and/or frequency domain occupancy information is proposed. Specifically, in the present disclosure, a method of notifying DL/UL direction information and/or frequency domain occupancy information about a BS for each CAP-BW (or each BWP/carrier, each CAP-BW/BWP/carrier group) is proposed. The proposal of the present disclosure may be limitedly applied to carriers operating in an unlicensed band (or a shared spectrum band).

In the present disclosure, the DL/UL direction and/or frequency domain occupancy information may be signaled through physical layer control information (e.g., DCI). For simplicity, in the present disclosure, the DCI is referred to as channel occupancy-DCI (CO-DCI). The CO-DCI may be configured based on the existing DCI format 2_0. As an example, the CO-DCI may be defined in DCI format 2_0. In this case, in order to indicate CO-DCI information (e.g., DL/UL direction and/or frequency domain occupancy information), a new field may be added to DCI format 2_0 or some fields of DCI format 2_0 may be reinterpreted. In addition, a new group common DCI format may be defined for CO-DCI. Alternatively, the CO-DCI may be configured based on an existing UE-specific DCI format. For example, the CO-DCI may be defined in an existing UE-specific DCI format. In this case, in order to indicate CO-DCI information, a new field may be added to the existing UE-specific DCI format or some fields of the existing UE-specific DCI format may be reinterpreted. In addition, a new UE-specific DCI format may be defined for the CO-DCI.

1) Receiver (Entity A (e.g., UE)):

[Method #1] Configuring an SFI Field for Each CAP-BW in the CO-DCI

Figure 11:
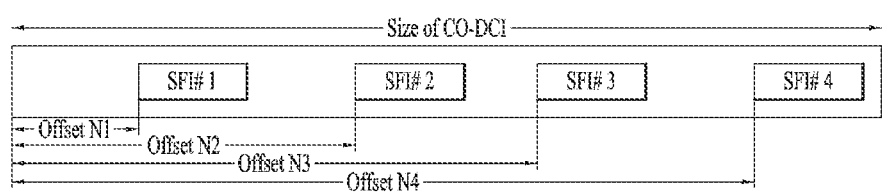
FIGS. 11 to 16 illustrate proposed methods in the description.

For example, in the CA situation of FIG. 10, N1 may be set for CAP-BW #1-1, N2 may be set for CAP-BW #1-2, N3 may be set for CAP-BW #2-1, and N4 may be set for CAP-BW #3-1, as shown in FIG. 11. Thereby, the SFI may be indicated for each CAP-BW in the CO-DCI.

[Method #1-1] Configuring an SFI Field for Each CAP-BW in the CO-DCI, Wherein Specific CAP-BWs May Share the Same Offset Value In FIG. 11, the entirety or part of N1/N2/N3/N4 may be set to the same value. For example, CAP-BW #1-1/#1-2 belong to the same carrier. Accordingly, on the assumption that the BS indicates the same D/U direction for CAP-BW #1-1/#1-2, DCI overhead may be reduced by indicating the D/U direction of CAP-BW #1-1/#1-2 through the same field in the CO-DCI. That is, the D/U direction (e.g., SFI field) may be configured for each carrier. However, since the ON/OFF (or available/unavailable) state of CAP-BW #1-1/#1-2 may also be shared, the ON/OFF state may not be indicated for each of the CAP-BWs. Such signaling configuration may implicitly indicate that the BS attempts to perform transmission only when the CAP is successful for both CAP-BW #1-1 and CAP-BW #1-2, which belong to CC #1, and otherwise, it does not transmit the DL burst. In addition, setting the offsets corresponding to CAP-BW #1-1/#1-2 belonging to the same carrier to the same value may mean that RBs corresponding to a guard band present between CAP-BW #1-1/#1-2 are available (e.g., mapped/transmitted) (for, for example, PDCCH, PDSCH and/or CSI-RS transmission) (or may be interpreted as meaning that the guard band is not configured).

Alternatively, a transmission mode related to a transmission method for each CAP-BW of the BS may be separately configured. For example, it may be separately signaled whether the mode is a mode (hereinafter, mode1) in which transmission is performed (in all CAP-BWs) only when the CAP is successful for all CAP-BWs belonging to the carrier/active BWP, or a mode (hereinafter, mode2) in which transmission is attempted for some CAP-BWs when the CAP is successful for the some CAP-BWs among the CAP-BWs belonging to the carrier/active BWP. When mode1 is configured, the UE may assume that the SFI field is shared (i.e., the same offset value is set or an offset value is set for each cell) for all the CAP-BWs belonging to the carrier/active BWP. When mode2 is configured, the UE may assume that the SFI field is configured for each CAP-BW belonging to the carrier/active BWP (i.e., a separate offset value is set, or an offset value is set for each CAP-BW).

In [Method #1] and [Method #1-1], through a specific state of the SFI field, it may be indicated that the CAP-BW (s) is OFF (that is, the BS does not attempt transmission due to CAP failure). As an example, when the SFI field is configured in 3 bits and is set to '000', it may indicate that the CAP-BW(s) corresponding to the SFI field is in an OFF state. As another example, when SlotFormatCombination is not linked to a specific state (e.g., SFI-index) of the SFI field, the state may be utilized to indicate the OFF state of the CAP-BW(s). The SFI field size may be determined by the set maximum number of SFI-indexes. When the SFI field size is 3 bits, SlotFormatCombination may not be configured for some of the 8 SFI-indexes. In this case, when the value of an SFI-index for which SlotFormatCombination is not configured is signaled, the UE may recognize that the corresponding CAP-BW(s) is in an OFF state.

When the CAP-BW(s) is in the OFF state, the UL slot/symbol information about the CAP-BW in the ON state belonging to the same carrier/BWP or the same band as the CAP-BW(s) may be passed on to the CAP-BW(s) in the OFF state. As an example, CAP-BW #1-1 may be signaled in the OFF state, but CAP-BW #1-2 may be signaled in the ON state (when separate SFI fields are configured for CAP-BW #1-1 and CAP-BW #1-2). In this case, for example, if all symbols of slot #k/k+1 are signaled as UL for CAP-BW #1-2 through CO-DCI, the UE may recognize that CAP-BW #1-1 is also UL for slot #k/k+1. This is because it may be considered impossible to perform reception in an adjacent band while performing transmission in the adjacent band, on the assumption that a BS operating in the unlicensed band generally operates through one radio frequency (RF) module. Accordingly, the UE may recognize that, during slot #k/k+1, PDCCH monitoring is not performed in either CAP-BW #1-1 or CAP-BW #1-2 and configured UL transmission (e.g., periodic/semi-persistent PUCCH/SRS, configured grant PUSCH, etc.) is allowed.

The DL burst or the channel occupancy of the BS may be divided into two time durations (for all cells configured in the unlicensed band or a part thereof). One is a duration (duration 1) within the first k slots, and the other is a duration (duration 2) after the first k slots. Here, k may be predefined as an integer greater than or equal to 1 or may be set by separate RRC signaling. The reason for dividing the DL burst or the channel occupancy of the BS into two durations is that the BS does not know a CAP-BW in which the BS will actually succeed in CAP, and thus the CAP-BW state information is uncertain in duration 1. Accordingly, even if CAP-BW ON is indicated, duration 1 may be treated similarly to a case where the CAP-BW is OFF. For example, the UE may perform PDCCH monitoring in the same manner as in the duration in which the CAP-BW is OFF (e.g., the same as PDCCH monitoring before CO-DCI is discovered), and may not perform CSI measurement. On the other hand, in duration 2, it may be clearly determined whether the CAP-BW is ON or OFF according to the CAP-BW state information. Accordingly, in duration 2, the UE may perform an operation according to CAP-BW ON/OFF. For example, when the CAP-BW is ON, the UE may perform PDCCH monitoring based on a scheme (e.g., search space set/DCI format) defined for the CAP-BW ON duration and also perform CSI measurement. For example, DCCH monitoring in the CAP-BW ON duration may include DCI format 0_X/1_X/2_0 monitoring. On the other hand, when the CAP-BW is OFF, the UE may perform PDCCH monitoring based on a scheme (e.g., search space set/DCI format) defined for the CAP-BW OFF duration and may not perform (e.g., may omit/skip) CSI measurement. For example, in the CAP-BW OFF duration, the PDCCH monitoring may include DCI format 2_0 monitoring, but may not include DCI format 0_X/1_X monitoring.

Accordingly, through the specific state of the SFI field, it may be indicated that the corresponding CAP-BW(s) (in the slot in which the CO-DCI is detected) belongs to the first slot of transmission (e.g., DL burst) or to the first k slot(s) in the time duration occupied by the BS. As an example, when the SFI field is configured in 3 bits and is set to '111', it may indicate that the CAP-BW(s) corresponding to the SFI field (in the slot in which the CO-DCI is detected) belongs to the first slot (or the first k slots) of the DL burst. As another example, when SlotFormatCombination is not linked to a specific state (e.g., SFI-index) of the SFI field, the state may be utilized. The SFI field size may be determined by the set maximum number of SFI-indexes. When the SFI field size is 3 bits, SlotFormatCombination may not be configured for some of the 8 SFI-indexes. In this case, when the value of SFI-index for which SlotFormatCombination is not configured is signaled, the UE may recognize that the CAP-BW(s) belongs to the first slot (or the first k slots) of the DL burst (in the slot in which the CO-DCI is detected). Then, the UE may assume DL (for all cells configured in the unlicensed band or a part thereof) during the first slot (or the first k slots) of the DL burst. That is, in the slot(s) in which the CAP-BW(s) is recognized as belonging to the first slot (or the first k slots) of the DL burst, all symbols may be assumed to be DL. Accordingly, the UE may perform PDCCH monitoring on the assumption that all symbols in the slot(s) are DL in the CAP-BW(s). In this method, in order to update the slot format of the CAP-BW(s), the BS may transmit DCI format 2_0 again within the same DL burst. For example, upon receiving SFI=111, the UE may recognize only that the CAP-BW(s) is the start of the DL burst, and identify the slot format (e.g., D/U/F) in the DL burst/COT based on the updated SFI information, while monitoring the PDCCH as in the case where the CAP-BW(s) is outside the DL burst.

In addition, the DL burst or the channel occupancy of the BS may be divided into two time durations (for all cells configured in the unlicensed band or a part thereof), and a search space set (or PDCCH) may be independently configured for each of the durations. For example, duration 1 may be defined as a duration within the first k slots in the DL burst or the channel occupancy of the BS (for all cells configured in the unlicensed band or a part thereof), and duration 2 may be defined as a duration after the first k slots in the DL burst or the channel occupancy of the BS (for all cells configured in the unlicensed band or a part thereof). Here, k may be predefined as an integer greater than or equal to 1 or may be set by separate RRC signaling. Specifically, when it is signaled/recognized that the CAP-BW(s) belongs to the first slot (or the first k slots) of the DL burst (in the slot in which the CO-DCI is detected), the UE may monitor a PDCCH belonging to a specific first search space set configured to be monitored for the corresponding duration (e.g., duration 1) (for all cells configured in the unlicensed band or a part thereof), or may monitor a specific first PDCCH configured to be monitored for the corresponding duration (e.g., duration 1). On the other hand, when it is signaled/recognized that the CAP-BW(s) is in the ON state (in the slot in which the CO-DCI is detected), but does not belong to the first slot (or the first k slots) of the DL burst, the UE may monitor a PDCCH belonging to a specific second search space set configured to be monitored for the corresponding duration (e.g., duration 2) (for all cells configured in the unlicensed band or a part thereof), or may monitor a specific second PDCCH configured to be monitored for the corresponding duration (e.g., duration 2). Here, the specific first and second search space sets may be different from each other. For example, the specific first and second search space sets may have different PDCCH monitoring periodicities. Also, the specific first and second PDCCHs may be different from each other. For example, DCI formats transmitted on the specific first and second PDCCHs may be different from each other. For example, the DCI format transmitted on the specific first PDCCH may include a group common DCI format (e.g., DCI format 2_0). Also, the DCI format transmitted on the specific second PDCCH may include a DCI format for data scheduling (e.g., DCI format 0_X/1_X) and a group common DCI format (e.g., DCI format 2_0).

Figure 12:
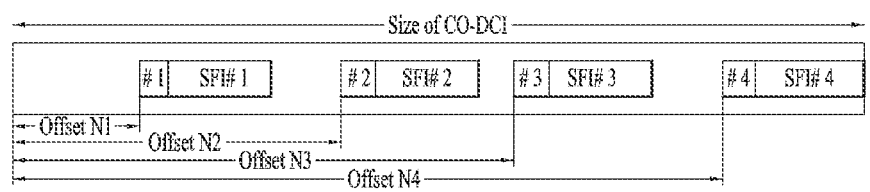

[Method #2] Configuring an SFI Field for Each CAP-BW in the CO-DCI and Configuring a Bitmap for Indicating the ON/OFF State of Each CAP-BW Through a Separate Field In the CA situation as shown in FIG. 10, N1 may be set for CAP-BW #1-1, N2 may be set for CAP-BW #1-2, N3 may be set for CAP-BW #2-1, and N4 may be set for CAP-BW #3-1, as shown in FIG. 12. Thereby, the ON/OFF state and SFI may be indicated for each CAP-BW in the CO-DCI. While the SFI field and the field indicating ON/OFF are illustrated in the figure as being consecutively positioned, a bit indicating the ON/OFF state may be added after the SFI field, or a bitmap or bit-field indicating ON/OFF may be configured through a separate offset value for each CAP-BW.

[Method #2-1] Configuring an SFI Field for Each CAP-BW in the CO-DCI and Configuring a Bitmap for Indicating the ON/OFF State of Each CAP-BW Through a Separate Field, Wherein Specific CAP-BWs May Share a SFI Field and/or a Bit-Field Value Indicating the ON/OFF State In FIG. 12, the entirety or part of N1/N2/N3/N4 may be set to the same value. For example, CAP-BW #1-1/#1-2 belong to the same carrier. Accordingly, on the assumption that the BS indicates the same D/U direction for CAP-BW #1-1/#1-2, DCI overhead may be reduced by indicating the D/U direction of CAP-BW #1-1/#1-2 through the same field in the CO-DCI. That is, the D/U direction (e.g., SFI field) may be configured for each carrier. However, since the ON/OFF state of CAP-BW #1-1/#1-2 is also shared, the ON/OFF state may not be indicated for each of the CAP-BWs. Such signaling configuration may implicitly indicate that the BS attempts to perform transmission only when the CAP is successful for both CAP-BW #1-1 and CAP-BW #1-2, which belong to CC #1, and otherwise, it does not transmit the DL burst. In addition, setting the offsets corresponding to CAP-BW #1-1/#1-2 belonging to the same carrier to the same value may mean that RBs corresponding to a guard band present between CAP-BW #1-1/#1-2 are available (e.g., mapped/transmitted) (for, for example, PDCCH, PDSCH and/or CSI-RS transmission) (or may be interpreted as meaning that the guard band is not configured).

Alternatively, a transmission mode related to a transmission method for each CAP-BW of the BS may be separately configured. For example, it may be separately signaled whether the mode is a mode (hereinafter, mode1) in which transmission is performed (in all CAP-BWs) only when CAP is successful for all CAP-BWs belonging to the carrier/active BWP, or a mode (hereinafter, mode2) in which transmission is attempted for some CAP-BWs when CAP is successful for the some CAP-BWs among the CAP-BWs belonging to the carrier/active BWP. When mode1 is configured, the UE may assume that the SFI field and the bitmap field are shared (e.g., only 1 bit is configured for the bitmap field corresponding to the cell, and only one SFI field is configured) for all the CAP-BWs belonging to the carrier/active BWP. When mode2 is configured, the UE may assume that a bit field in the bitmap is configured for each CAP-BW belonging to the carrier/active BWP (that is, a bitmap field and an offset value for the SFI field are configured for each CAP-BW).

Figure 13:
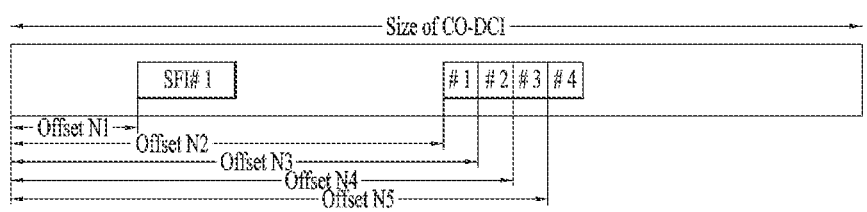

As another example, as shown in FIG. 13, an offset value of N1 may be set in common for the SFI fields for CAP-BW #1-1/1-2/2-1/3-1. In addition, in the bitmap indicating the ON/OFF state, offset values of N2/N3/N4/N5 may be set for each CAP-BW, or all or some of N2/N3/N4/N5 may be set to the same value. If N2 and N3 are set to the same value, the ON/OFF state for CAP-BW #1-1/#1-2 may also be shared, and thus the ON/OFF state may not be indicated for each of the CAP-BWs. Such signaling configuration may implicitly indicate that the BS attempts to perform transmission only when the CAP is successful for both CAP-BW #1-1 and CAP-BW #1-2, which belong to CC #1, and otherwise, it does not transmit the DL burst. In addition, setting the offsets corresponding to CAP-BW #1-1/#1-2 belonging to the same carrier to the same value may mean that RBs corresponding to a guard band present between CAP-BW #1-1/#1-2 are available (e.g., mapped/transmitted) (for, for example, PDCCH, PDSCH and/or CSI-RS transmission) (or may be interpreted as meaning that the guard band is not configured).

Figure 14:
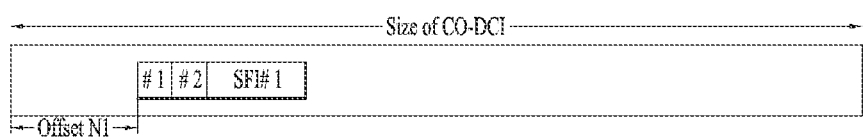

As another example, as shown in FIG. 14, for each CC (or BWP), a common offset N1 (with respect to the SFI field position) may be set, and a bitmap indicating the ON/OFF state may be signaled through a k-bit bitmap after the offset value (or before the offset value, after the end of the field size configured after N1, after the field size configured after N1). Here, k may be equal to the number of CAP-BWs corresponding to the CC (or BWP), and may be less than or equal to the number of CAP-BWs corresponding to the CC (or BWP). When k is less than the CAP-BWs, the value of k may be signaled separately. In addition, when k is less than the CAP-BWs, the relationship between each bit of the k-bit bitmap and the corresponding CAP-BW(s) may be preconfigured by the BS. When k=1, the ON/OFF state for CAP-BW #1-1/#1-2 may also be shared, and thus the ON/OFF state may not be indicated for each CAP-BW. Such signaling configuration may implicitly indicate that the BS attempts to perform transmission only when the CAP is successful for both CAP-BW #1-1 and CAP-BW #1-2, which belong to CC #1, and otherwise, it does not transmit the DL burst. In addition, setting the bit values corresponding to the ON/OFF states of CAP-BW #1-1-/#1-2 belonging to the same carrier to the same position may mean that RBs corresponding to a guard band present between CAP-BW #1-1/#1-2 are available (e.g., mapped/transmitted) (for, for example, PDCCH, PDSCH and/or CSI-RS transmission) (or may be interpreted as meaning that the guard band is not configured).

Alternatively, a transmission mode related to a transmission method for each CAP-BW of the BS may be separately configured. For example, it may be separately signaled whether the mode is a mode (hereinafter, mode1) in which transmission is performed (in all CAP-BWs) only when CAP is successful for all CAP-BWs belonging to the carrier/active BWP, or a mode (hereinafter, mode2) in which transmission is attempted for some CAP-BWs when CAP is successful for the some CAP-BWs among the CAP-BWs belonging to the carrier/active BWP. When mode1 is configured, the UE may assume that the bitmap field indicating the ON/OFF state is shared for all CAP-BWs belonging to the carrier/active BWP (that is, only 1 bit is configured for the bitmap field corresponding to the cell). Alternatively, if a bit field in the bitmap is configured for each CAP-BW belonging to the carrier/active BWP when mode1 is configured, the UE may assume that only '1' or '0' is signaled in the bitmap. When mode2 is configured, the UE may assume that a bit field in the bitmap is configured for each CAP-BW belonging to the carrier/active BWP (that is, an offset value for the bitmap field is set for each CAP-BW).

In [Method #2] and [Method #2-1], the UE may recognize that the corresponding CAP-BW is OFF if 1-bit information corresponding to each CAP-BW(s) is '0' (or '1'), and that the corresponding CAP-BW is ON if the information is '1' (or '0'). When the CAP-BW(s) is in the OFF state, the UL slot/symbol information about the CAP-BW in the ON state belonging to the same carrier/BWP or the same band as the CAP-BW(s) may be passed on to the CAP-BW(s) in the OFF state. As an example, CAP-BW #1-1 may be signaled in the OFF state, but CAP-BW #1-2 may be signaled in the ON state (when ON/OFF information about CAP-BW #1-1 and ON/OFF information about CAP-BW #1-2 are signaled through separate bit-fields and the SFI field is signaled in common). In this case, for example, if all symbols of slot #k/k+1 are signaled as UL for CAP-BW #1-2 through CO-DCI, the UE may recognize that CAP-BW #1-1 is also UL for slot #k/k+1. This is because it may be considered impossible to perform reception in an adjacent band while performing transmission in the adjacent band, on the assumption that a BS operating in the unlicensed band generally operates through one RF module. Accordingly, the UE may recognize that, during slot #k/k+1, PDCCH monitoring is not performed in either CAP-BW #1-1 or CAP-BW #1-2, and that configured UL transmission (e.g., periodic/semi-persistent PUCCH/SRS, configured grant PUSCH, etc.) is allowed.

Alternatively, even if the CAP-BW(s) is signaled in the OFF state, the UE may recognize that the UL information on the SFI signaling corresponding to the CAP-BW is valid. As an example, when CAP-BW #1-1 is signaled in the OFF state, and all symbols of slot #k/k+1 are signaled as DL and all symbols of slot #k+2/k+3 are signaled as UL for CAT-BW #1-1, the UE may recognize slot #k+2/k+3 as UL, ignoring SFI signaling in slot #k/k+1. In this case, the UE may recognize that PDCCH monitoring is not performed in CAP-BW #1-1 during slot #k/k+1/k+2/k+3, and that configured UL transmission (e.g., periodic/semi-persistent PUCCH/SRS, configured grant PUSCH, etc.) is allowed during slot #k+2/k+3.

Alternatively, through a specific state of the SFI field and/or the bitmap field, it may be indicated that the CAP-BW(s) (in the slot in which the CO-DCI is detected) belongs to the first slot of transmission (e.g., DL burst) or belongs to the first k slot(s) in a time duration occupied by the BS. Here, the value of k may be predefined as an integer greater than or equal to 1 or may be set by separate RRC signaling. As a method, when all bits in the bitmap that correspond to all CAP-BW(s) corresponding to a cell in which the CO-DCI is transmitted signal OFF, it may be indicated that the CAP-BW(s) (in the slot in which the CO-DCI is detected) belongs to the first slot (or the first k slots) of the DL burst. It is contradictory that all CAP-BW(s) corresponding to the cell are OFF when the CO-DCI is transmitted from the cell. Accordingly, this transmission may be used for the above-described signaling. That is, through the CO-DCI transmission, it may be indirectly indicated that the CAP-BW is ON. In addition, through the CAP-BW ON/OFF information, it may be indicated that the CAP-BW belongs to the first slot (or the first k slots) of the DL burst. For example, when the CO-DCI is transmitted on CC #1, if all the ON/OFF information in the bitmap corresponding to CAP-BW #1-1 and CAP-BW #1-2 is OFF, it may be indicated that CAP-BW #1-1 and CAP-BW #1-2 (in the slot in which the CO-DCI is detected) belong to the first slot (or the first k slots) of the DL burst.

In addition, the CO-DCI may be transmitted on CC #A, and all the ON/OFF information corresponding to CC #A/B may be included in the CO-DCI (i.e., cross-carrier indication). At this time, since the CAP-BW ON/OFF information for CC #B is transmitted on the other CC (e.g., CC #A), it may be ambiguous whether there is actual transmission by the BS on CC #B. Therefore, if all the CAP-BW(s) for CC #A are OFF, the UE may assume that the DL burst has started even on CC #B (even if transmission is actually performed only on CC #A). On the other hand, if some or all of the CAP-BW(s) for CC #A are later updated to ON, information on CC #B may be recognized as a real OFF only when all the CAP-BW ON/OFF information for CC #B is OFF. For example, CO-DCI may be transmitted on CC #1, and all ON/OFF information corresponding to CC #1/2/3 may be included in the CO-DCI. In this case, the UE receiving CO-DCI in which all ON/OFF information on the bitmap corresponding to CAP-BW #1-1/CAP-BW #1-2/CAP-BW #2-1/CAP-BW #3-1 is OFF may recognize that CC #2 and CC #3 as well as CC #1 (in the slot in which the CO-DCI is detected) belong to the first slot (or the first k slots) of the DL burst. Also, CO-DCI may be transmitted on CC #2, and all ON/OFF information corresponding to CC #1/2/3 may be included in the CO-DCI. In this case, the UE receiving, on CC #2, the CO-DCI including bitmap information corresponding to CAP-BW #1-1=OFF, CAP-BW #1-2=OFF, CAP-BW #2-1=ON, and CAP-BW #3-1=OFF may recognize that any of CAP-BW #1-1 and CAP-BW #1-2 belonging to CC #1 does not belong to the first slot (or the first k slots) of the DL burst because CC #2 does not belong to the first slot (or the first k slots) of the DL burst (in the slot in which the CO-DCI is detected). Accordingly, the UE may recognize that actual DL reception is not available in CAP-BW #1-1 and CAP-BW #1-2.

As an example, when the SFI field is configured in 3 bits and is set to '111', it may indicate that the CAP-BW corresponding to the SFI field (in the slot in which the CO-DCI is detected) belongs to the first slot (or the first k slots) of the DL burst. As another example, when SlotFormatCombination is not linked to a specific state (e.g., SFI-index) of the SFI field, the state may be utilized. The SFI field size may be determined by the set maximum number of SFI-indexes. When the SFI field size is 3 bits, SlotFormatCombination may not be configured for some of the 8 SFI-indexes. In this case, when the value of SFI-index for which SlotFormatCombination is not configured is signaled, the UE may recognize that the CAP-BW(s) belongs to the first slot (or the first k slots) of the DL burst (in the slot in which the CO-DCI is detected). Then, the UE may assume DL (for all cells configured in the unlicensed band or a part thereof) during the first slot (or the first k slots) of the DL burst. That is, in the slot(s) in which the CAP-BW(s) is recognized as belonging to the first slot (or the first k slots) of the DL burst, all symbols may be assumed to be DL. Accordingly, the UE may perform PDCCH monitoring on the assumption that all symbols in the slot(s) are DL in the CAP-BW(s). In this method, in order to update the slot format of the CAP-BW(s), the BS may transmit DCI format 2_0 again within the same DL burst. For example, upon receiving SFI=111, the UE may recognize only that the CAP-BW(s) is the start of the DL burst, and identify the slot format (e.g., D/U/F) in the DL burst/COT based on the updated SFI information, while monitoring the PDCCH as in the case where the CAP-BW(s) is outside the DL burst.

In addition, the DL burst or the channel occupancy of the BS may be divided into two time durations (for all cells configured in the unlicensed band or a part thereof), and a search space set (or PDCCH) to be monitored may be independently configured for each of the durations. For example, duration 1 may be defined as a duration within the first k slots in the DL burst or the channel occupancy of the BS (for all cells configured in the unlicensed band or a part thereof), and duration 2 may be defined as a duration after the first k slots in the DL burst or the channel occupancy of the BS (for all cells configured in the unlicensed band or a part thereof). Here, k may be predefined as an integer greater than or equal to 1 or may be set by separate RRC signaling. Specifically, when it is signaled/recognized that the CAP-BW(s) belongs to the first slot (or the first k slots) of the DL burst (in the slot in which the CO-DCI is detected), the UE may monitor a PDCCH belonging to a specific first search space set configured to be monitored for the corresponding duration (e.g., duration 1) (for all cells configured in the unlicensed band or a part thereof), or may monitor a specific first PDCCH configured to be monitored for the corresponding duration (e.g., duration 1). Alternatively, since it is uncertain whether CSI-RS is transmitted in the CAP-BW for the corresponding duration (e.g., duration 1), the UE may not need to perform CSI measurement (or RRM/RLM measurement) through the CSI-RS that is configured to be transmitted for the corresponding duration (e.g., duration 1). On the other hand, when it is signaled/recognized that the CAP-BW(s) is in the ON state (in the slot in which the CO-DCI is detected), but does not belong to the first slot (or the first k slots) of the DL burst, the UE may monitor a PDCCH belonging to a specific second search space set configured to be monitored for the corresponding duration (e.g., duration 2) (for all cells configured in the unlicensed band or a part thereof), or may monitor a specific second PDCCH configured to be monitored for the corresponding duration (e.g., duration 2). Alternatively, CSI measurement (or RRM/RLM measurement) through a CSI-RS that is configured to be transmitted for the corresponding duration (e.g., duration 2) may be performed by the UE. Here, the specific first and second search space sets may be different from each other. For example, the specific first and second search space sets may have different PDCCH monitoring periodicities. Also, the specific first and second PDCCHs may be different from each other. DCI formats transmitted on the specific first and second PDCCHs may be different from each other.

[Method #3] Method for Configuring Time Domain DL/UL Direction

The maximum channel occupancy time (MCOT) may be determined according to a priority class corresponding to the CAP performed by the BS (see Table 9), and the BS may set a time less than or equal to the MCOT as a COT duration thereof. In this case, the BS may inform the UE of the COT than or equal to the MCOT as a COT duration. Accordingly, the UE may perform PDCCH monitoring configured outside the COT duration. For example, outside the COT duration, it is not known when the BS will transmit the PDCCH. Accordingly, monitoring may be performed very frequently, but may be performed at a much slower tempo in the COT duration. Such monitoring may be beneficial in terms of power consumption of the UE. In addition, the UE may distinguish between UL in the COT duration or UL outside the COT duration. In the case of UL in the COT duration, it may be determined whether the channel is idle/busy only for a predetermined time period. When the channel is idle, UL transmission may be allowed without random backoff. Alternatively, UL transmission may be allowed after a predetermined time without determining whether the channel is idle/busy. On the other hand, in the case of UL outside the COT duration, UL transmission may be allowed only when a random backoff-based CAP is performed.

[Method #3-1] Explicitly Signaling COT Duration in CO-DCI

In the CO-DCI, the COT start slot index, and/or the COT last slot index, and/or the COT duration from a specific slot may be signaled through a separate field. The field may be configured for each CAP-BW, for each carrier/active BWP, or for a group of CAP-BWs, a group of carriers/active BWPs, or an unlicensed band in common.

There may be a difference between a duration in which SFI information is applied and the COT duration. For example, while the period for monitoring the CO-DCI is set to 4 slots, the COT information in the CO-DCI may indicate that the COT duration is 1 slot. In this case, the SFI information should include information about at least 4 slots, and how the UE should interpret the SFI information indicated for the remaining 3 slots may be a challenge.

For example, when the SFI information of the SFI field corresponds to k slots and the time at which CO-DCI is received is slot #n, DL/UL information corresponding to slot #n to slot #n+k−1 may be signaled through the SFI information. In this case, the last slot index indicated by the field indicating the COT duration may be after slot #n+k−1. In this case, the SFI information may be applied for the DL/UL information corresponding to slot #n to slot #n+k−1, but an assumption may be required for DL/UL information after slot #n+k−1. Hereinafter, a method assumed by the UE is discussed.

Opt1) By applying the wrap-around scheme, a rule may be set such that SFI information corresponding to slot #n+k corresponds to slot #n, and SFI information corresponding to slot #n+k+1 corresponds to slot #n+1.

Opt2) A rule may be set such that SFI in slot #n+k−1 (or corresponding to the last symbol of slot #n+k−1) is repeated after slot #n+k−1.

Opt3) A rule may be set such that specific SFI (e.g., all DL or all UL) is repeated after slot #n+k−1.

Opt4) A rule may be set such that the UE does not expect the aforementioned case. Alternatively, the UE may expect to receive DL/UL information in the corresponding duration through reception of additional CO-DCI, and may apply one of Opt1 to Opt3 if it fails to receive the information.

[Method #3-2] Implicitly Signaling the COT Duration Through a Combination of Specific SFIs in the CO-DCI SFI information for slot #k may be duplicated/transmitted in slot #n and slot #m. Here, when SFI information corresponding to slot #k signaled in slot #n is A, and SFI information corresponding to slot #k signaled in slot #m is B, slot #k may be defined as the last slot of the COT occupied by the BS. As an example, A may be all DL and B may be all UL.

SFI information after the last slot index of the COT recognized through [Method #3-1] and/or [Method #3-2] may be present. As an example, the SFI information for CAP-BW #1-1 of CO-DCI received in slot #n may span up to slot #n+k, but the last slot index of the COT indicated by the CO-DCI may be slot #n+k−2. In this regard, a method for processing the SFI information for slot #n+k−1 and slot #n+k is proposed.

OptA) SFI information for slot #n+k−1 and slot #n+k may be ignored. For example, even when the UE receives the SFI information for slot #n+k−1 and slot #n+k, it may be operated as if it did not receive the SFI information for slot #n+k−1 and slot #n+k.

OptB) Only UL information in the SFI information for slots #n+k−1 and #n+k may be considered valid. In this case, the UE may not perform PDCCH monitoring for the corresponding UL duration, and may recognize the duration as a UL duration outside the COT duration.

OptC) The UE may not expect such a case to occur.

Figure 15:
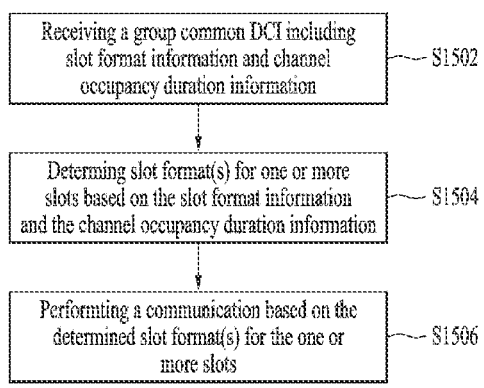

FIG. 15 illustrates a communication procedure according to an example of the present disclosure. Referring to FIG. 15, the UE may receive group common DCI including slot format information and channel occupancy duration information (S1502). Here, the slot format information may correspond to N slot formats. Each of the slot formats may correspond to a symbol configuration of a corresponding slot within N consecutive slots, wherein N may be an integer greater than or equal to 1. The channel occupancy duration information corresponds to a channel occupancy duration. The channel occupancy duration may include M consecutive slots, wherein M may be an integer greater than or equal to 1. The group common DCI may include CO-DCI (e.g., DCI format 2_0), and the CRC may be scrambled with a group common RNTI (e.g., SFI RNTI). Thereafter, the UE may determine a slot format for one or more slots based on the slot format information and the channel occupancy period information (S1504), and may perform communication based on the determined slot format for the one or more slots (S1506). For details, refer to Methods #3/#3-1/#3-2.

For example, based on N being less than M, communication may be performed on an assumption that the N slot formats sequentially correspond to slots subsequent to an N-th slot in the channel occupancy duration (Method #3-1, Opt1). Also, based on N being less than M, communication may be performed on an assumption that the last slot format of the N slot formats repeatedly corresponds to the slots subsequent to the N-th slot in the channel occupancy duration (Method #3-1, Opt2). As another example, based on N being greater than M, communication may be performed only in the channel occupancy duration based on the slot format information, while slot formats after an M-th slot format among the N slot formats are ignored (Method #3-2, OptA). Also, based on N being greater than M, communication may be performed on an assumption that only UL symbols are valid in the slot formats after the M-th slot format among the N slot formats (Method #3-2, OptB).

[Method #4]

In transmitting CO-DCI, a group of carrier/active BWPs and/or CAP-BWs may be configured. A rule may be set such that all the SFI information and ON/OFF information about the carrier/active BWPs and/or CAP-BWs belonging to the configured group are included in the CO-DCI, and the CO-DCI is transmitted over all the carriers/active BWPs and/or CAP-BWs belonging to the configured group.

2) Transmitter (Entity B (e.g., BS)):

[Method #1A] Allocating SFI Field for Each CAP-BW in CO-DCI

For example, in the CA situation of FIG. 10, N1 may be allocated for CAP-BW #1-1, N2 may be allocated for CAP-BW #1-2, N3 may be allocated for CAP-BW #2-1, and N4 may be allocated for CAP-BW #3-1, as shown in FIG. 11. Thereby, the SFI may be indicated for each CAP-BW in the CO-DCI.

[Method #1A-1] Configuring an SFI Field for Each CAP-BW in the CO-DCI, Wherein Specific CAP-BWs May Share the Same Offset Value In FIG. 11, the entirety or part of N1/N2/N3/N4 may be set to the same value. For example, CAP-BW #1-1/#1-2 belong to the same carrier. Accordingly, on the assumption that the BS indicates the same D/U direction for CAP-BW #1-1/#1-2, DCI overhead may be reduced by indicating the D/U direction of CAP-BW #1-1/#1-2 through the same field in the CO-DCI. That is, the D/U direction (e.g., SFI field) may be configured for each carrier. However, since the ON/OFF state of CAP-BW #1-1/#1-2 may also be shared, the ON/OFF state may not be indicated for each of the CAP-BWs. Such signaling configuration may implicitly indicate that the BS attempts to perform transmission only when the CAP is successful for both CAP-BW #1-1 and CAP-BW #1-2, which belong to CC #1, and otherwise, it does not transmit the DL burst. In addition, setting the offsets corresponding to CAP-BW #1-1/#1-2 belonging to the same carrier to the same value may mean that RBs corresponding to a guard band present between CAP-BW #1-1/#1-2 are available (e.g., mapped/transmitted) (for, for example, PDCCH, PDSCH and/or CSI-RS transmission) (or may be interpreted as meaning that the guard band is not configured).

Alternatively, a transmission mode related to a transmission method for each CAP-BW of the BS may be separately configured. For example, it may be separately signaled whether the mode is a mode (hereinafter, mode1) in which transmission is performed (in all CAP-BWs) only when the CAP is successful for all CAP-BWs belonging to the carrier/active BWP, or a mode (hereinafter, mode2) in which transmission is attempted for some CAP-BWs when the CAP is successful for the some CAP-BWs among the CAP-BWs belonging to the carrier/active BWP. When mode1 is configured, the BS may assume that the SFI field is shared (i.e., the same offset value is set or an offset value is set for each cell) for all the CAP-BWs belonging to the carrier/active BWP. When mode2 is configured, the BS may assume that the SFI field is configured for each CAP-BW belonging to the carrier/active BWP (i.e., a separate offset value is set, or an offset value is set for each CAP-BW).

In [Method #1A] and [Method #1-1A], through a specific state of the SFI field, it may be indicated that the CAP-BW (s) is OFF (that is, the BS does not attempt transmission due to CAP failure). As an example, when the SFI field is configured in 3 bits and is set to '000', it may indicate that the CAP-BW(s) corresponding to the SFI field is in an OFF state. As another example, when SlotFormatCombination is not linked to a specific state (e.g., SFI-index) of the SFI field, the state may be utilized to indicate the OFF state of the CAP-BW(s). The SFI field size may be determined by the set maximum number of SFI-indexes. When the SFI field size is 3 bits, SlotFormatCombination may not be configured for some of the 8 SFI-indexes. In this case, when the value of an SFI-index for which SlotFormatCombination is not configured is signaled, the BS may inform that the corresponding CAP-BW(s) is in an OFF state.

When the CAP-BW(s) is in the OFF state, the UL slot/symbol information about the CAP-BW in the ON state belonging to the same carrier/BWP or the same band as the CAP-BW(s) may be passed on to the CAP-BW(s) in the OFF state. As an example, CAP-BW #1-1 may be signaled in the OFF state, but CAP-BW #1-2 may be signaled in the ON state (when separate SFI fields are configured for CAP-BW #1-1 and CAP-BW #1-2). In this case, for example, if all symbols of slot #k/k+1 are signaled as UL for CAP-BW #1-2 through CO-DCI, the BS may inform that CAP-BW #1-1 is also UL for slot #k/k+1. This is because it may be considered impossible to perform reception in an adjacent band while performing transmission in the adjacent band, on the assumption that a BS operating in the unlicensed band generally operates through one radio frequency (RF) module. Accordingly, the BS may inform that, during slot #k/k+1, PDCCH monitoring is not performed in either CAP-BW #1-1 or CAP-BW #1-2 and configured UL transmission (e.g., periodic/semi-persistent PUCCH/SRS, configured grant PUSCH, etc.) is allowed.

In addition, through the specific state of the SFI field, it may be indicated that the corresponding CAP-BW(s) (in the slot in which the CO-DCI is detected) belongs to the first slot of transmission (e.g., DL burst) or to the first k slot(s) in the time duration occupied by the BS. As an example, when the SFI field is configured in 3 bits and is set to '111', it may indicate that the CAP-BW(s) corresponding to the SFI field (in the slot in which the CO-DCI is detected) belongs to the first slot (or the first k slots) of the DL burst. As another example, when SlotFormatCombination is not linked to a specific state (e.g., SFI-index) of the SFI field, the state may be utilized. The SFI field size may be determined by the set maximum number of SFI-indexes. When the SFI field size is 3 bits, SlotFormatCombination may not be configured for some of the 8 SFI-indexes. In this case, when the value of SFI-index for which SlotFormatCombination is not configured is signaled, the BS may inform that the CAP-BW(s) belongs to the first slot (or the first k slots) of the DL burst (in the slot in which the CO-DCI is detected). In this case, the BS may inform that DL is configured (for all cells configured in the unlicensed band or a part thereof) in the first slot (or the first k slots) of the DL burst. That is, in the slot(s) in which the CAP-BW(s) is recognized as belonging to the first slot (or the first k slots) of the DL burst, all symbols may be assumed to be DL. Accordingly, the BS may perform PDCCH transmission on the assumption that all symbols in the slot(s) are DL in the CAP-BW(s). In this method, in order to update the slot format of the CAP-BW (s), the BS may transmit DCI format 2_0 again within the same DL burst. For example, upon receiving SFI=111, the UE may recognize only that the CAP-BW(s) is the start of the DL burst, and identify the slot format (e.g., D/U/F) in the DL burst/COT based on the updated SFI information, while monitoring the PDCCH as in the case where the CAP-BW(s) is outside the DL burst.

In addition, the DL burst or the channel occupancy of the BS may be divided into two time durations (for all cells configured in the unlicensed band or a part thereof), and a search space set (or PDCCH) may be independently configured for each of the durations. For example, duration 1 may be defined as a duration within the first k slots in the DL burst or the channel occupancy of the BS (for all cells configured in the unlicensed band or a part thereof), and duration 2 may be defined as a duration after the first k slots in the DL burst or the channel occupancy of the BS (for all cells configured in the unlicensed band or a part thereof). Here, k may be predefined as an integer greater than or equal to 1 or may be set by separate RRC signaling. Specifically, when it is signaled/recognized that the CAP-BW(s) belongs to the first slot (or the first k slots) of the DL burst (in the slot in which the CO-DCI is detected), the BS may transmit a PDCCH through a specific first search space set for the corresponding duration (e.g., duration 1) (for all cells configured in the unlicensed band or a part thereof), or may transmit a specific first PDCCH for the corresponding duration (e.g., duration 1). On the other hand, when it is signaled/recognized that the CAP-BW(s) is in the ON state (in the slot in which the CO-DCI is detected), but does not belong to the first slot (or the first k slots) of the DL burst, the BS may transmit a PDCCH through a specific second search space set for the corresponding duration (e.g., duration 2) (for all cells configured in the unlicensed band or a part thereof), or may transmit a specific second PDCCH for the corresponding duration (e.g., duration 2). Here, the specific first and second search space sets may be different from each other. For example, the specific first and second search space sets may have different PDCCH monitoring periodicities. Also, the specific first and second PDCCHs may be different from each other. For example, DCI formats transmitted on the specific first and second PDCCHs may be different from each other. For example, the DCI format transmitted on the specific first PDCCH may include a group common DCI format (e.g., DCI format 2_0). Also, the DCI format transmitted on the specific second PDCCH may include a DCI format for data scheduling (e.g., DCI format 0_X/1_X) and a group common DCI format (e.g., DCI format 2_0).

[Method #2A] Allocating the SFI Field for Each CAP-BW in the CO-DCI and Configuring a Bitmap for Indicating the ON/OFF State of Each CAP-BW Through a Separate Field In the CA situation as shown in FIG. 10, N1 may be allocated to CAP-BW #1-1, N2 may be allocated to CAP-BW #1-2, N3 may be allocated to CAP-BW #2-1, and N4 may be allocated to CAP-BW #3-1, as shown in FIG. 12. Thereby, the ON/OFF state and SFI may be indicated for each CAP-BW in the CO-DCI. While the SFI field and the field indicating ON/OFF are illustrated in the figure as being consecutively positioned, a bit indicating the ON/OFF state may be added after the SFI field, or a bitmap or bit-field indicating ON/OFF may be configured through a separate offset value for each CAP-BW.

[Method #2A-1] Configuring an SFI Field for Each CAP-BW in the CO-DCI and Configuring a Bitmap for Indicating the ON/OFF State of Each CAP-BW Through a Separate Field, Wherein Specific CAP-BWs May Share a SFI Field and/or a Bit-Field Value Indicating the ON/OFF State In FIG. 12, the entirety or part of N1/N2/N3/N4 may be set to the same value. For example, CAP-BW #1-1/#1-2 belong to the same carrier. Accordingly, on the assumption that the BS indicates the same D/U direction for CAP-BW #1-1/#1-2, DCI overhead may be reduced by indicating the D/U direction of CAP-BW #1-1/#1-2 through the same field in the CO-DCI. That is, the D/U direction (e.g., SFI field) may be configured for each carrier. However, since the ON/OFF state of CAP-BW #1-1/#1-2 is also shared, the ON/OFF state may not be indicated for each of the CAP-BWs. Such signaling configuration may implicitly indicate that the BS attempts to perform transmission only when the CAP is successful for both CAP-BW #1-1 and CAP-BW #1-2, which belong to CC #1, and otherwise, it does not transmit the DL burst. In addition, setting the offsets corresponding to CAP-BW #1-1/#1-2 belonging to the same carrier to the same value may mean that RBs corresponding to a guard band present between CAP-BW #1-1/#1-2 are available (e.g., mapped/transmitted) (for, for example, PDCCH, PDSCH and/or CSI-RS transmission) (or may be interpreted as meaning that the guard band is not configured).

Alternatively, a transmission mode related to a transmission method for each CAP-BW of the BS may be separately configured. For example, it may be separately signaled whether the mode is a mode (hereinafter, mode1) in which transmission is performed (in all CAP-BWs) only when the CAP is successful for all CAP-BWs belonging to the carrier/active BWP, or a mode (hereinafter, mode2) in which transmission is attempted for some CAP-BWs when the CAP is successful for the some CAP-BWs among the CAP-BWs belonging to the carrier/active BWP. When mode1 is configured, the BS may assume that the SFI field and the bitmap field are shared (e.g., only 1 bit is configured for the bitmap field corresponding to the cell, and only one SFI field is configured) for all the CAP-BWs belonging to the carrier/active BWP. When mode2 is configured, the BS may assume that a bit field in the bitmap is configured for each CAP-BW belonging to the carrier/active BWP (that is, a bitmap field and an offset value for the SFI field are configured for each CAP-BW).

As another example, as shown in FIG. 13, an offset value of N1 may be set in common for the SFI fields for CAP-BW #1-1/1-2/2-1/3-1. In addition, in the bitmap indicating the ON/OFF state, offset values of N2/N3/N4/N5 may be set for each CAP-BW, or all or some of N2/N3/N4/N5 may be set to the same value. If N2 and N3 are set to the same value, the ON/OFF state for CAP-BW #1-1/#1-2 may also be shared, and thus the ON/OFF state may not be indicated for each of the CAP-BWs. Such signaling configuration may implicitly indicate that the BS attempts to perform transmission only when the CAP is successful for both CAP-BW #1-1 and CAP-BW #1-2, which belong to CC #1, and otherwise, it does not transmit the DL burst. In addition, setting the offsets corresponding to CAP-BW #1-1/#1-2 belonging to the same carrier to the same value may mean that RBs corresponding to a guard band present between CAP-BW #1-1/#1-2 are available (e.g., mapped/transmitted) (for, for example, PDCCH, PDSCH and/or CSI-RS transmission) (or may be interpreted as meaning that the guard band is not configured).

As another example, as shown in FIG. 14, for each CC (or BWP), a common offset N1 (with respect to the SFI field position) may be set, and a bitmap indicating the ON/OFF state may be signaled through a k-bit bitmap after the offset value (or before the offset value, after the end of the field size configured after N1, after the field size configured after N1). Here, k may be equal to the number of CAP-BWs corresponding to the CC (or BWP), and may be less than or equal to the number of CAP-BWs corresponding to the CC (or BWP). When k is less than the CAP-BWs, the value of k may be signaled separately. In addition, when k is less than the CAP-BWs, the relationship between each bit of the k-bit bitmap and the corresponding CAP-BW(s) may be preconfigured by the BS. When k=1, the ON/OFF state for CAP-BW #1-1/#1-2 may also be shared, and thus the ON/OFF state may not be indicated for each CAP-BW. Such signaling configuration may implicitly indicate that the BS attempts to perform transmission only when the CAP is successful for both CAP-BW #1-1 and CAP-BW #1-2, which belong to CC #1, and otherwise, it does not transmit the DL burst. In addition, setting the bit values corresponding to the ON/OFF states of CAP-BW #1-1-/#1-2 belonging to the same carrier to the same position may mean that RBs corresponding to a guard band present between CAP-BW #1-1/#1-2 are available (e.g., mapped/transmitted) (for, for example, PDCCH, PDSCH and/or CSI-RS transmission) (or may be interpreted as meaning that the guard band is not configured).

Alternatively, a transmission mode related to a transmission method for each CAP-BW of the BS may be separately configured. For example, it may be separately signaled whether the mode is a mode (hereinafter, mode1) in which transmission is performed (in all CAP-BWs) only when the CAP is successful for all CAP-BWs belonging to the carrier/active BWP, or a mode (hereinafter, mode2) in which transmission is attempted for some CAP-BWs when the CAP is successful for the some CAP-BWs among the CAP-BWs belonging to the carrier/active BWP. When mode1 is configured, the BS may assume that the bitmap field indicating the ON/OFF state is shared for all CAP-BWs belonging to the carrier/active BWP (that is, only 1 bit is configured for the bitmap field corresponding to the cell). Alternatively, if a bit field in the bitmap is configured for each CAP-BW belonging to the carrier/active BWP when mode1 is configured, the UE may assume that only '1' or '0' is signaled in the bitmap. When mode2 is configured, the BS may assume that a bit field in the bitmap is configured for each CAP-BW belonging to the carrier/active BWP (that is, an offset value for the bitmap field is set for each CAP-BW).

In [Method #2A] and [Method #2-1A], the BS may inform that the corresponding CAP-BW is OFF if 1-bit information corresponding to each CAP-BW(s) is '0' (or '1'), and that the corresponding CAP-BW is ON if the information is '1' (or '0'). When the CAP-BW(s) is in the OFF state, the UL slot/symbol information about the CAP-BW in the ON state belonging to the same carrier/BWP or the same band as the CAP-BW(s) may be passed on to the CAP-BW(s) in the OFF state. As an example, CAP-BW #1-1 may be signaled in the OFF state, but CAP-BW #1-2 may be signaled in the ON state (when ON/OFF information about CAP-BW #1-1 and ON/OFF information about CAP-BW #1-2 are signaled through separate bit-fields and the SFI field is signaled in common). In this case, for example, if all symbols of slot #k/k+1 are signaled as UL for CAP-BW #1-2 through CO-DCI, the BS may inform that CAP-BW #1-1 is also UL for slot #k/k+1. This is because it may be considered impossible to perform reception in an adjacent band while performing transmission in the adjacent band, on the assumption that a BS operating in the unlicensed band generally operates through one RF module. Accordingly, the BS may inform that, during slot #k/k+1, PDCCH monitoring is not performed in either CAP-BW #1-1 or CAP-BW #1-2, and that configured UL transmission (e.g., periodic/semi-persistent PUCCH/SRS, configured grant PUSCH, etc.) is allowed.

Alternatively, even if the CAP-BW(s) is signaled in the OFF state, the BS may recognize that the UL information on the SFI signaling corresponding to the CAP-BW is valid. As an example, when CAP-BW #1-1 is signaled in the OFF state, and all symbols of slot #k/k+1 are signaled as DL and all symbols of slot #k+2/k+3 are signaled as UL for CAT-BW #1-1, the BS may inform that slot #k+2/k+3 is UL, ignoring SFI signaling in slot #k/k+1. In this case, the BS may inform that PDCCH monitoring is not performed in CAP-BW #1-1 during slot #k/k+1/k+2/k+3, and that configured UL transmission (e.g., periodic/semi-persistent PUCCH/SRS, configured grant PUSCH, etc.) is allowed during slot #k+2/k+3.

Alternatively, through a specific state of the SFI field and/or the bitmap field, it may be indicated that the CAP-BW(s) (in the slot in which the CO-DCI is detected) belongs to the first slot of transmission (e.g., DL burst) or belongs to the first k slot(s) in a time duration occupied by the BS. Here, the value of k may be predefined as an integer greater than or equal to 1 or may be set by separate RRC signaling. As a method, when all bits in the bitmap that correspond to all CAP-BW(s) corresponding to a cell in which the CO-DCI is transmitted signal OFF, it may be indicated that the CAP- BW(s) (in the slot in which the CO-DCI is detected) belongs to the first slot (or the first k slots) of the DL burst. It is contradictory that all CAP-BW(s) corresponding to the cell are OFF when the CO-DCI is transmitted from the cell. Accordingly, this transmission may be used for the above-described signaling. That is, through the CO-DCI transmission, it may be indirectly indicated that the CAP-BW is ON. In addition, through the CAP-BW ON/OFF information, it may be indicated that the CAP-BW belongs to the first slot (or the first k slots) of the DL burst. For example, when the CO-DCI is transmitted on CC #1, if all the ON/OFF information in the bitmap corresponding to CAP-BW #1-1 and CAP-BW #1-2 is OFF, it may be indicated that CAP-BW #1-1 and CAP-BW #1-2 (in the slot in which the CO-DCI is detected) belong to the first slot (or the first k slots) of the DL burst.

In addition, the CO-DCI may be transmitted on CC #A, and all the ON/OFF information corresponding to CC #A/B may be included in the CO-DCI (i.e., cross-carrier indication). At this time, since the CAP-BW ON/OFF information for CC #B is transmitted on the other CC (e.g., CC #A), it may be ambiguous whether there is actual transmission by the BS on CC #B. Therefore, if all the CAP-BW(s) for CC #A are OFF, the UE may assume that the DL burst has started even on CC #B (even if transmission is actually performed only on CC #A). On the other hand, if some or all of the CAP-BW(s) for CC #A are later updated to ON, information on CC #B may be recognized as a real OFF only when all the CAP-BW ON/OFF information for CC #B is OFF. For example, CO-DCI may be transmitted on CC #1, and all ON/OFF information corresponding to CC #1/2/3 may be included in the CO-DCI. In this case, the BS transmitting CO-DCI in which all ON/OFF information on the bitmap corresponding to CAP-BW #1-1/CAP-BW #1-2/CAP-BW #2-1/CAP-BW #3-1 is OFF may inform the UE that CC #2 and CC #3 as well as CC #1 (in the slot in which the CO-DCI is detected) belong to the first slot (or the first k slots) of the DL burst. Also, CO-DCI may be transmitted on CC #2, and all ON/OFF information corresponding to CC #1/2/3 may be included in the CO-DCI. In this case, the BS transmitting, on CC #2, the CO-DCI including bitmap information corresponding to CAP-BW #1-1=OFF, CAP-BW #1-2=OFF, CAP-BW #2-1=ON, and CAP-BW #3-1=OFF may inform the UE that any of CAP-BW #1-1 and CAP-BW #1-2 belonging to CC #1 does not belong to the first slot (or the first k slots) of the DL burst because CC #2 does not belong to the first slot (or the first k slots) of the DL burst (in the slot in which the CO-DCI is detected). Accordingly, the UE may recognize that actual DL reception is not available in CAP-BW #1-1 and CAP-BW #1-2.

As an example, when the SFI field is configured in 3 bits and is set to '111', it may indicate that the CAP-BW corresponding to the SFI field (in the slot in which the CO-DCI is detected) belongs to the first slot (or the first k slots) of the DL burst. As another example, when SlotFormatCombination is not linked to a specific state (e.g., SFI-index) of the SFI field, the state may be utilized. The SFI field size may be determined by the set maximum number of SFI-indexes. When the SFI field size is 3 bits, SlotFormatCombination may not be configured for some of the 8 SFI-indexes. In this case, when the value of SFI-index for which SlotFormatCombination is not configured is signaled, the BS may inform that the CAP-BW(s) belongs to the first slot (or the first k slots) of the DL burst (in the slot in which the CO-DCI is detected). Then, the UE may assume DL (for all cells configured in the unlicensed band or a part thereof) during the first slot (or the first k slots) of the DL burst. That is, in the slot(s) in which the CAP-BW(s) is recognized as belonging to the first slot (or the first k slots) of the DL burst, all symbols may be assumed to be DL. Accordingly, the UE may perform PDCCH monitoring on the assumption that all symbols in the slot(s) are DL in the CAP-BW(s). In this method, in order to update the slot format of the CAP-BW(s), the BS may transmit DCI format 2_0 again within the same DL burst. For example, upon receiving SFI=111, the UE may recognize only that the CAP-BW(s) is the start of the DL burst, and identify the slot format (e.g., D/U/F) in the DL burst/COT based on the updated SFI information, while monitoring the PDCCH as in the case where the CAP-BW(s) is outside the DL burst.

In addition, the DL burst or the channel occupancy of the BS may be divided into two time durations (for all cells configured in the unlicensed band or a part thereof), and a search space set (or PDCCH) may be independently configured for each of the durations. For example, duration 1 may be defined as a duration within the first k slots in the DL burst or the channel occupancy of the BS (for all cells configured in the unlicensed band or a part thereof), and duration 2 may be defined as a duration after the first k slots in the DL burst or the channel occupancy of the BS (for all cells configured in the unlicensed band or a part thereof). Here, k may be predefined as an integer greater than or equal to 1 or may be set by separate RRC signaling. Specifically, when it is signaled/recognized that the CAP-BW(s) belongs to the first slot (or the first k slots) of the DL burst (in the slot in which the CO-DCI is detected), the BS may transmit a PDCCH through a specific first search space set for the corresponding duration (e.g., duration 1) (for all cells configured in the unlicensed band or a part thereof), or may transmit a specific first PDCCH for the corresponding duration (e.g., duration 1). Alternatively, since it is uncertain whether CSI-RS is transmitted in the CAP-BW for the corresponding duration (e.g., duration 1), the BS may not expect, from the UE, a report on CSI measurement (or RRM/RLM measurement) through the CSI-RS that is configured to be transmitted for the corresponding duration (e.g., duration 1). On the other hand, when it is signaled/recognized that the CAP-BW(s) is in the ON state (in the slot in which the CO-DCI is detected), but does not belong to the first slot (or the first k slots) of the DL burst, the BS may transmit a PDCCH belonging to a specific second search space set for the corresponding duration (e.g., duration 2) (for all cells configured in the unlicensed band or a part thereof), or may transmit a specific second PDCCH for the corresponding duration (e.g., duration 2). Alternatively, the BS may not expect, from the UE, a report on CSI measurement (or RRM/RLM measurement) through a CSI-RS that is configured to be transmitted for the corresponding duration (e.g., duration 2). Here, the specific first and second search space sets may be different from each other. For example, the specific first and second search space sets may have different PDCCH monitoring periodicities. Also, the specific first and second PDCCHs may be different from each other. DCI formats transmitted on the specific first and second PDCCHs may be different from each other.

[Method #3A] Method for Configuring Time Domain DL/UL Direction

The maximum channel occupancy time (MCOT) may be determined according to a priority class corresponding to the CAP performed by the BS (see Table 9), and the BS may set a time less than or equal to the MCOT as a COT duration thereof. In this case, the BS may inform the UE of the COT than or equal to the MCOT as a COT duration. Accordingly, the UE may perform PDCCH monitoring configured outside the COT duration. For example, outside the COT duration, it is not known when the BS will transmit the PDCCH. Accordingly, monitoring may be performed very frequently, but may be performed at a much slower tempo in the COT duration. Such monitoring may be beneficial in terms of power consumption of the UE. In addition, the UE may distinguish between UL in the COT duration or UL outside the COT duration. In the case of UL in the COT duration, it may be determined whether the channel is idle/busy only for a predetermined time period. When the channel is idle, UL transmission may be allowed without random backoff. Alternatively, UL transmission may be allowed after a predetermined time without determining whether the channel is idle/busy. On the other hand, in the case of UL outside the COT duration, UL transmission may be allowed only when a random backoff-based CAP is performed.

[Method #3A-1] Explicitly Signaling COT Duration in CO-DCI

In the CO-DCI, the COT start slot index, and/or the COT last slot index, and/or the COT duration from a specific slot may be signaled through a separate field. The field may be configured for each CAP-BW, for each carrier/active BWP, or for a group of CAP-BWs, a group of carriers/active BWPs, or an unlicensed band in common.

There may be a difference between a duration in which SFI information is applied and the COT duration. For example, while the period for monitoring the CO-DCI is set to 4 slots, the COT information in the CO-DCI may indicate that the COT duration is 1 slot. In this case, the SFI information should include information about at least 4 slots, and how the UE should interpret the SFI information indicated for the remaining 3 slots may be a challenge.

For example, when the SFI information of the SFI field corresponds to k slots and the time at which CO-DCI is received is slot #n, DL/UL information corresponding to slot #n to slot #n+k−1 may be signaled through the SFI information. In this case, the last slot index indicated by the field indicating the COT duration may be after slot #n+k−1. In this case, the SFI information may be applied for the DL/UL information corresponding to slot #n to slot #n+k−1, but an assumption may be required for DL/UL information after slot #n+k−1. Hereinafter, a method assumed by the UE is discussed.

Opt1) By applying the wrap-around scheme, a rule may be set such that SFI information corresponding to slot #n+k corresponds to slot #n, and SFI information corresponding to slot #n+k+1 corresponds to slot #n+1.

Opt2) A rule may be set such that SFI in slot #n+k−1 (or corresponding to the last symbol of slot #n+k−1) is repeated after slot #n+k−1.

Opt3) A rule may be set such that specific SFI (e.g., all DL or all UL) is repeated after slot #n+k−1.

Opt4) A rule may be set such that the UE does not expect the aforementioned case. Alternatively, the UE may expect to receive DL/UL information in the corresponding duration through reception of additional CO-DCI, and may apply one of Opt1 to Opt3 if it fails to receive the information.

[Method #3A-2] Implicitly Signaling the COT Duration Through a Combination of Specific SFIs in the CO-DCI SFI information for slot #k may be duplicated/transmitted in slot #n and slot #m. Here, when SFI information corresponding to slot #k signaled in slot #n is A, and SFI information corresponding to slot #k signaled in slot #m is B, slot #k may be defined as the last slot of the COT occupied by the BS. As an example, A may be all DL and B may be all UL.

SFI information after the last slot index of the COT recognized through [Method #3-1] and/or [Method #3-2] may be present. As an example, the SFI information for CAP-BW #1-1 of CO-DCI received in slot #n may span up to slot #n+k, but the last slot index of the COT indicated by the CO-DCI may be slot #n+k−2. In this regard, a method for processing the SFI information for slot #n+k−1 and slot #n+k is proposed.

OptA) SFI information for slot #n+k−1 and slot #n+k may be ignored. For example, even when the UE receives the SFI information for slot #n+k−1 and slot #n+k, it may operated as if it did not receive the SFI information for slot #n+k−1 and slot #n+k. Accordingly, communication may be performed based on the SFI information only within the COT duration.

OptB) Only UL information in the SFI information for slots #n+k−1 and #n+k may be considered valid. Accordingly, the UE may not perform PDCCH monitoring for the corresponding UL duration, and may recognize the duration as a UL duration outside the COT duration. That is, during slot #n+k−1 and slot #n+k, the UE may not perform PDCCH monitoring, and may recognize the UL duration of slots #n+k−1 and #n+k as a UL duration outside the COT duration.

OptC) The UE may not expect such a case to occur.

[Method #4A]

In transmitting CO-DCI, a group of carrier/active BWPs and/or CAP-BWs may be configured. A rule may be set such that all the SFI information and ON/OFF information about the carrier/active BWPs and/or CAP-BWs belonging to the configured group are included in the CO-DCI, and the CO-DCI is transmitted over all the carriers/active BWPs and/or CAP-BWs belonging to the configured group.

3) Receiver & Transmitter (Between Receiver and Transmitter)

Figure 16:
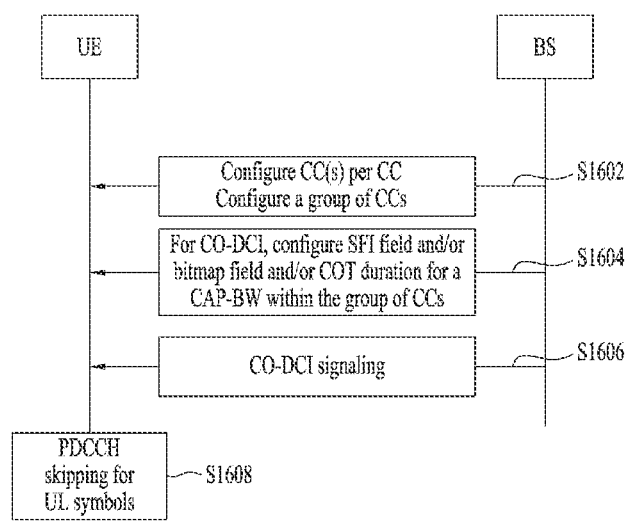

As shown in FIG. 16, first, a UE may receive configuration of CCs in an unlicensed band and a BWP for each CC from a BS (S1602). In addition, the UE may receive configuration of a CC group from the BS. Such a configuration may be established based on higher layer (e.g., RRC) signaling and/or DCI. In addition, an SFI field in the CO-DCI corresponding to the CAP-BW(s) in the CC group, and/or a bitmap field indicating the CAP-BW ON/OFF state, and/or a COT duration information field may be allocated to the UE by the BS (S1604). Here, the configuration for the allocation may be established based on higher layer (e.g., RRC) signaling and/or DCI. For example, information (e.g., offset) about the start position of the information in the CO-DCI may be shared through higher layer signaling.

Thereafter, the UE may receive the CO-DCI from the BS (S1606). Here, the CO-DCI may be transmitted in an unlicensed band or a licensed band. In this case, the UE may receive ON/OFF information, DL/UL information, and/or COT duration information about the corresponding CAP-BW(s) based on the field information configured in the CO-DCI. In this case, based on the received information, the UE may achieve a power saving effect by skipping PDCCH monitoring and/or channel measurement for the CAP-BW(s) which are in the OFF state or in the UL duration. Also, the BS may transmit a signal to the UE through the unlicensed band(s) occupied by the BS based on the CO-DCI. In response, the UE may receive the signal through the unlicensed band(s) occupied by the BS based on the CO-DCI.

The UE may perform a network access procedure to carry out the procedures and/or methods described/proposed above. For example, the UE may receive and store in the memory system information and configuration information necessary for performing the above-described/proposed procedures and/or methods while performing access to a network (e.g., BS). The configuration information necessary for the present disclosure may be received through higher layer (e.g., RRC layer, Medium Access Control (MAC) layer, etc.) signaling.

Figure 17:
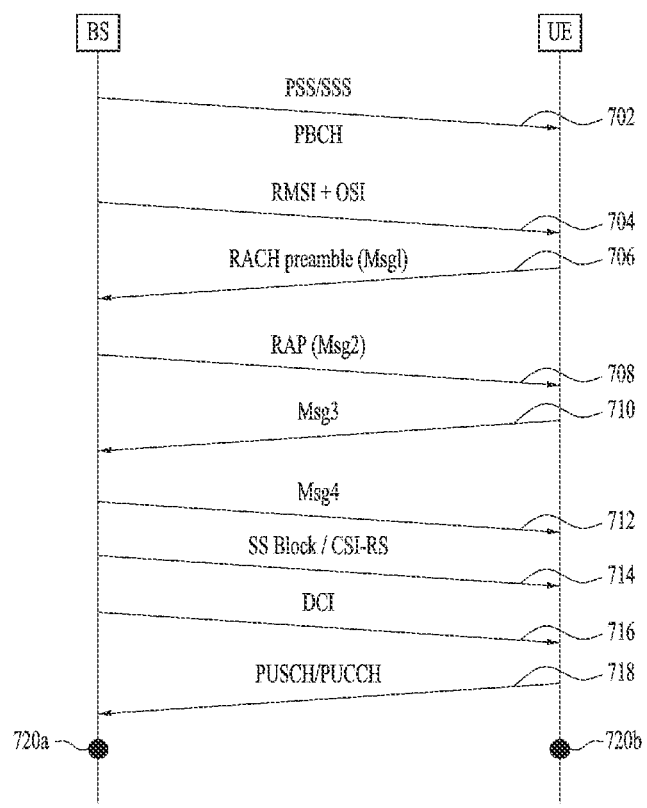
FIG. 17 illustrates a network access procedure, which is applied to the present disclosure.

FIG. 17 illustrates a network access procedure and a communication procedure thereafter. In NR, a physical channel and a reference signal may be transmitted using beamforming. When beamforming-based signal transmission is supported, a beam management procedure may be involved in order to align beams between the BS and the UE. In addition, the signal proposed by the present disclosure may be transmitted/received using beamforming. In Radio Resource Control (RRC) IDLE mode, beam alignment may be performed based on the SSB. On the other hand, in the RRC CONNECTED mode, beam alignment may be performed based on the CSI-RS (in DL) and the SRS (in UL). When beamforming-based signal transmission is not supported, an operation related to a beam may be omitted in the following description.

Referring to FIG. 17, a BS (e.g., gNB) may periodically transmit an SSB (S702). Here, the SSB includes PSS/SSS/PBCH. The SSB may be transmitted using beam sweeping. Thereafter, the BS may transmit remaining minimum system information (RMSI) and other system information (OSI) (S704). The RMSI may include information (e.g., PRACH configuration information) necessary for the UE to initially access the BS. The UE identifies the best SSB after performing SSB detection. Thereafter, the UE may transmit a RACH preamble (Message 1 (Msg1)) to the BS through a PRACH resource linked/corresponding to the index (i.e., beam) of the best SSB (S706). The beam direction of the RACH preamble is associated with the PRACH resource. The association between the PRACH resource (and/or the RACH preamble) and the SSB (index) may be configured through the system information (e.g., RMSI). Then, as part of the RACH procedure, the BS may transmit a random access response (RAR) (Msg2) in response to the RACH preamble (S708), and the UE may transmit Msg3 (e.g., RRC Connection Request) using the UL grant in the RAR (S710). The BS may transmit a contention resolution message (Msg4) (S720). Msg4 may include RRC Connection Setup.

Once the RRC connection is established between the BS and the UE through the RACH procedure, subsequent beam alignment may be performed based on the SSB/CSI-RS (in DL) and the SRS (in UL). For example, the UE may receive an SSB/CSI-RS (S714). The SSB/CSI-RS may be used for the UE to generate a beam/CSI report. The BS may make a request for a beam/CSI report to the UE through DCI (S716). In this case, the UE may generate a beam/CSI report based on the SSB/CSI-RS and transmit the generated beam/CSI report to the BS on a PUSCH/PUCCH (S718). The beam/CSI report may include a beam measurement result, information about a preferred beam, and the like. The BS and the UE may switch beams based on the beam/CSI report (S720a, S720b).

Thereafter, the UE and the BS may perform the procedures and/or methods described/proposed above. For example, based on the configuration information obtained in the network access procedure (e.g., the system information acquisition procedure, the RRC connection procedure through RACH, etc.), the UE and the BS may process the information in the memory and transmit a radio signal according to the proposal of the present disclosure or may process a received radio signal and store the same in the memory. Here, the radio signal may include at least one of a PDCCH, a PDSCH, and a reference signal (RS) in the case of downlink, and may include at least one of a PUCCH, a PUSCH, and an SRS in the case of uplink. Specifically, as part of the network access procedure (e.g., system information acquisition procedure, RRC connection procedure through RACH, etc.), the UE may receive, from the BS, configuration information about at least one of the CC, BWP, SFI, LTE-BW, COT and/or transmission mode described herein. Accordingly, communication may be performed between the UE and the BS according to the method proposed herein. For example, according to the proposed method of the present disclosure, the BS may transmit CO-DCI to the UE, and the UE may perform communication based on the CO-DCI (e.g., see FIGS. 11 to 16).

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 18:
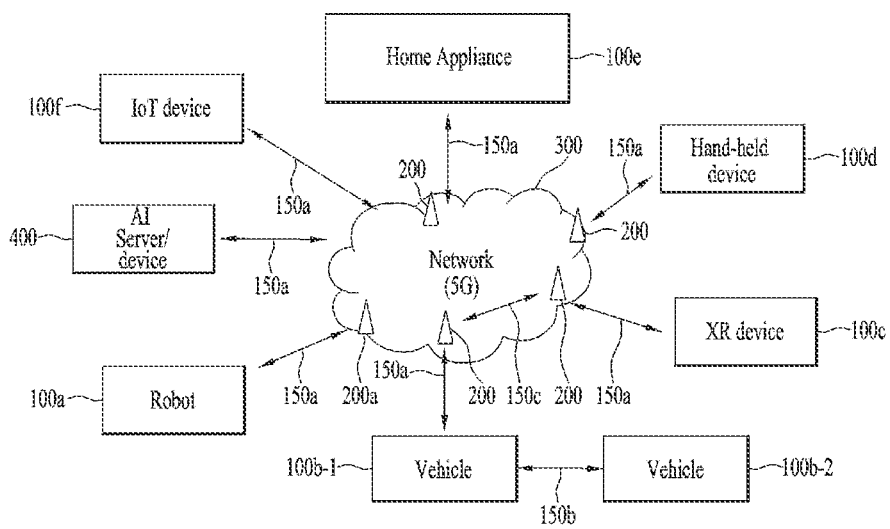
FIGS. 18 to 21 illustrate a communication system 1 and wireless devices, which are applied to the present disclosure.

FIG. 18 illustrates a communication system 1 applied to the present disclosure.

Referring to FIG. 18, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 19:
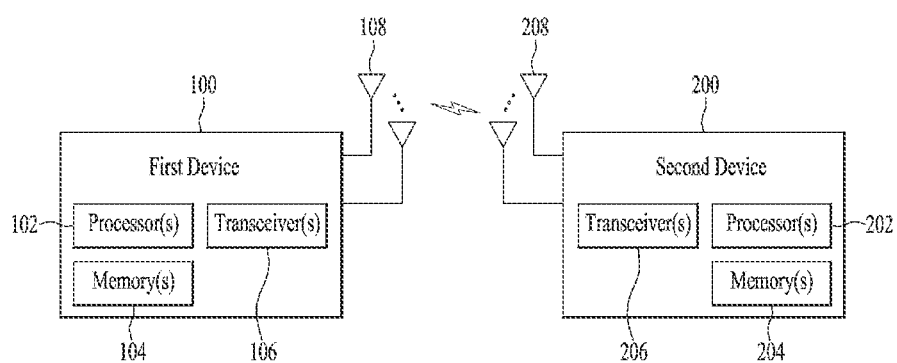

FIG. 19 illustrates wireless devices applicable to the present disclosure.

Referring to FIG. 19, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Herein, at least one memory (e.g., 104 or 204) may store instructions or programs. When executed, the instructions or programs may cause at least one processor operably coupled to the at least one memory to perform operations according to some embodiments or implementations of the present disclosure.

In the present disclosure, a computer readable (storage) medium may store at least one instruction or computer program, wherein the at least one instruction or computer program may cause, when executed by at least one processor, the at least one processor to perform operations according to some embodiments or implementations of the present disclosure.

In the present disclosure, a processing device or apparatus may include at least one processor and at least one computer memory connectable to the at least one processor. The at least one computer memory may store instructions or programs. When executed, the instructions or programs may cause the at least one processor operably coupled to the at least one memory to perform operations according to some embodiments or implementations of the present disclosure.

Figure 20:
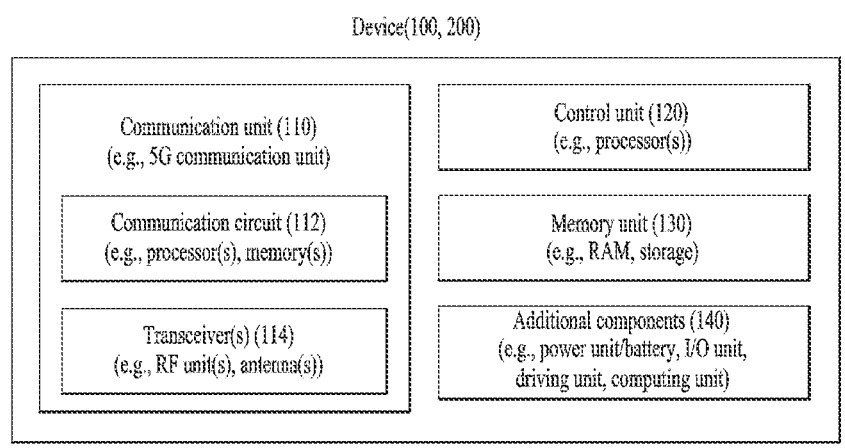

FIG. 20 illustrates another example of a wireless device applied to the present disclosure. The wireless device may be implemented in various forms according to a use case/service (refer to FIG. 18).

Referring to FIG. 20, wireless devices 100 and 200 may correspond to the wireless devices 100 and 200 of FIG. 19 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcasting terminal, a hologram device, a public safety device, an MTC device, a medical device, a FinTech device (or a finance device), a security device, a climate/environment device, the AI server/device (400 of FIG. 18), the BSs (200 of FIG. 18), a network node, or the like. The wireless device may be mobile or fixed according to a use case/service.

In FIG. 20, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 21:
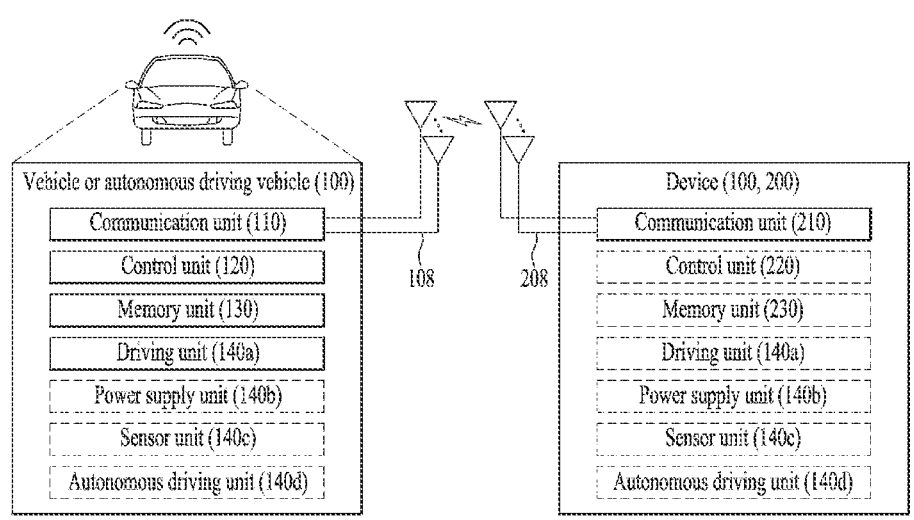

FIG. 21 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 21, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described above are combinations of elements and features of the present disclosure. The elements or features may be considered optional unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure may be used for a UE, a BS, or other equipment in a wireless mobile communication system.

The invention claimed is:

1. A method for performing a communication by a user equipment (UE) in a wireless communication system supporting an unlicensed band, the method comprising:
receiving a Synchronization Signal/Physical Broadcast Channel (SS/PBCH) block (SSB);
based on the received SSB, obtaining configuration information about an operation mode in the unlicensed band;
receiving Downlink Control Information (DCI) including a band availability indicator field used for indicating whether a plurality of bands for a serving cell are available,
wherein, based on the operation mode being configured as a first mode by the configuration information, the band availability indicator field includes a single bit used for indicating whether all of the plurality of bands for the serving cell are available, and
wherein, based on the operation mode being configured as a second mode by the configuration information, the band availability indicator field includes a plurality of bits and each of the plurality of bits is used for indicating availability of each corresponding band within the plurality of bands for the serving cell; and
receiving a downlink data within at least one of the plurality of bands indicated by the band availability indicator field.

2. The method of claim 1,
wherein, based on the first mode, the downlink data is transmitted within the plurality of bands only when a channel access procedure (CAP) is successful for all of the plurality of bands, and
wherein, based on the second mode, the downlink data is transmitted when the CAP is successful for any of the plurality of bands.

3. The method of claim 2,
wherein the CAP is performed for each of the plurality of bands.

4. The method of claim 1,
wherein the DCI is a group common DCI.

5. The method of claim 1,
wherein, based on the first mode, a value of '1' of the band availability indicator field indicates that all of the plurality of bands are available, and a value of '0' of the band availability indicator field indicates that all of the plurality of bands are unavailable.

6. A user equipment (UE) configured to operate in a wireless communication system supporting an unlicensed band, comprising:
at least one processor; and
at least one computer memory operably coupled to the at least one processor and configured to cause, when executed, the at least one processor to perform operations comprising:
receiving a Synchronization Signal/Physical Broadcast Channel (SS/PBCH) block (SSB);
based on the received SSB, obtaining configuration information about an operation mode in the unlicensed band;
receiving Downlink Control Information (DCI) including a band availability indicator field used for indicating whether a plurality of bands for a serving cell are available,
wherein, based on the operation mode being configured as a first mode by the configuration information, the band availability indicator field includes a single bit used for indicating whether all of the plurality of bands for the serving cell are available, and
wherein, based on the operation mode being configured as a second mode by the configuration information, the band availability indicator field includes a plurality of bits and each of the plurality of bits is used for indicating availability of each corresponding band within the plurality of bands for the serving cell; and
receiving a downlink data within at least one of the plurality of bands indicated by the band availability indicator field.

7. The UE of claim 6,
wherein, based on the first mode, the downlink data is transmitted within the plurality of bands only when a channel access procedure (CAP) is successful for all of the plurality of bands, and
wherein, based on the second mode, the downlink data is transmitted when the CAP is successful for any of the plurality of bands.

8. The UE of claim 7,
wherein the CAP is performed for each of the plurality of bands.

9. The UE of claim 6,
wherein the DCI is a group common DCI.

10. The UE of claim 6,
wherein, based on the first mode, a value of '1' of the band availability indicator field indicates that all of the plurality of bands are available, and a value of '0' of the band availability indicator field indicates that all of the plurality of bands are unavailable.

11. An apparatus for a terminal, the apparatus comprising:
at least one processor; and
at least one computer memory operably coupled to the at least one processor and configured to cause, when executed, the at least one processor to perform operations comprising:
receiving a Synchronization Signal/Physical Broadcast Channel (SS/PBCH) block (SSB);
based on the received SSB, obtaining configuration information about an operation mode in an unlicensed band;
receiving Downlink Control Information (DCI) including a band availability indicator field used for indicating whether a plurality of bands for a serving cell are available,
wherein, based on the operation mode being configured as a first mode by the configuration information, the band availability indicator field includes 1-bit used for indicating whether all of the plurality of bands for the serving cell are available, and
wherein, based on the operation mode being configured as a second mode by the configuration information, the band availability indicator field includes a plurality of bits and each of the plurality of bits is used for indicating availability of each corresponding band within the plurality of bands for the serving cell; and
receiving a downlink data within at least one of the plurality of bands indicated by the band availability indicator field.

12. The apparatus of claim 11,
wherein based on the first mode, the downlink data is transmitted within the plurality of bands only when a channel access procedure (CAP) is successful for all of the plurality of bands, and
wherein, based on the second mode, the downlink data is transmitted when the CAP is successful for any of the plurality of bands.

13. The apparatus of claim 12,
wherein the CAP is performed for each of the plurality of bands.

14. The apparatus of claim 11,
wherein the DCI is a group common DCI.

15. The apparatus of claim 11,
wherein, based on the first mode, a value of '1' of the band availability indicator field indicates that all of the plurality of bands are available, and a value of '0' of the band availability indicator field indicates that all of the plurality of bands are unavailable.

* * * * *